(12) United States Patent
Fulton et al.

(10) Patent No.: US 10,550,784 B2
(45) Date of Patent: Feb. 4, 2020

(54) SYSTEM AND METHOD FOR STARTING AN ENGINE

(71) Applicant: Ford Global Technologies, LLC, Dearborn, MI (US)

(72) Inventors: Brien Fulton, Bloomfield Hills, MI (US); Michiel Van Nieuwstadt, Ann Arbor, MI (US); Claus Maerschank, Wuerselen (DE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 15/912,395

(22) Filed: Mar. 5, 2018

(65) Prior Publication Data

US 2019/0271276 A1  Sep. 5, 2019

(51) Int. Cl.
| | |
|---|---|
| *F02D 41/06* | (2006.01) |
| *F02D 41/18* | (2006.01) |
| *F02D 41/14* | (2006.01) |
| *F01N 3/20* | (2006.01) |
| *F02B 37/18* | (2006.01) |
| *F02D 41/00* | (2006.01) |

(52) U.S. Cl.
CPC ......... *F02D 41/064* (2013.01); *F01N 3/2073* (2013.01); *F02B 37/18* (2013.01); *F02D 41/0007* (2013.01); *F02D 41/0035* (2013.01); *F02D 41/1447* (2013.01); *F02D 41/187* (2013.01); *F01N 2410/06* (2013.01); *F01N 2560/06* (2013.01)

(58) Field of Classification Search
CPC ............... F02D 41/064; F02D 41/0007; F02D 41/0035; F02D 41/187; F02D 41/1447; F01N 3/2073; F02B 37/18; F02N 2560/06
USPC ..................................................... 123/179.18
See application file for complete search history.

(56) References Cited

U.S. PATENT DOCUMENTS

| | | | |
|---|---|---|---|
| 5,704,323 A * | 1/1998 | Gardell | F02B 37/04 |
| | | | 123/179.18 |
| 7,137,253 B2 | 11/2006 | Furman et al. | |
| 7,159,551 B2 | 1/2007 | Cecur et al. | |
| 7,404,383 B2 | 7/2008 | Elendt | |
| 8,950,384 B2 | 2/2015 | Vigild et al. | |
| 9,127,626 B2 | 9/2015 | Banker et al. | |
| 9,605,603 B2 | 3/2017 | Glugla et al. | |
| 9,810,169 B2 * | 11/2017 | Desai | F02D 41/064 |
| 2002/0083700 A1 * | 7/2002 | Ellmer | F01N 3/32 |
| | | | 60/278 |
| 2005/0109029 A1 * | 5/2005 | Busch | F01N 3/22 |
| | | | 60/605.1 |
| 2006/0053788 A1 * | 3/2006 | Furman | B60K 6/24 |
| | | | 60/608 |
| 2006/0180130 A1 | 8/2006 | St. James | |
| 2007/0056282 A1 | 3/2007 | Iwaszkiewicz | |

(Continued)

*Primary Examiner* — Mahmoud Gimie
(74) *Attorney, Agent, or Firm* — Geoffrey Brumbaugh; McCoy Russell LLP

(57) ABSTRACT

Methods and systems for operating an engine with an electrically driven compressor are described. In one example, output of the electrically driven compressor is adjusted to increase a temperature of an engine so that the engine may be started without glow plugs or with glow plugs that have a lower heat capacity output. Additionally, a position of a recirculation valve may be adjusted to increase the temperature of the engine.

19 Claims, 27 Drawing Sheets

(56) References Cited

U.S. PATENT DOCUMENTS

| | | |
|---|---|---|
| 2011/0022289 A1 | 1/2011 | Hofbauer |
| 2013/0000613 A1* | 1/2013 | Meano ................ F02D 41/064 123/565 |
| 2015/0083092 A1 | 3/2015 | Desai |
| 2016/0153332 A1* | 6/2016 | Pappenheimer ...... F02B 25/145 60/274 |
| 2017/0002954 A1 | 1/2017 | Brown et al. |

* cited by examiner

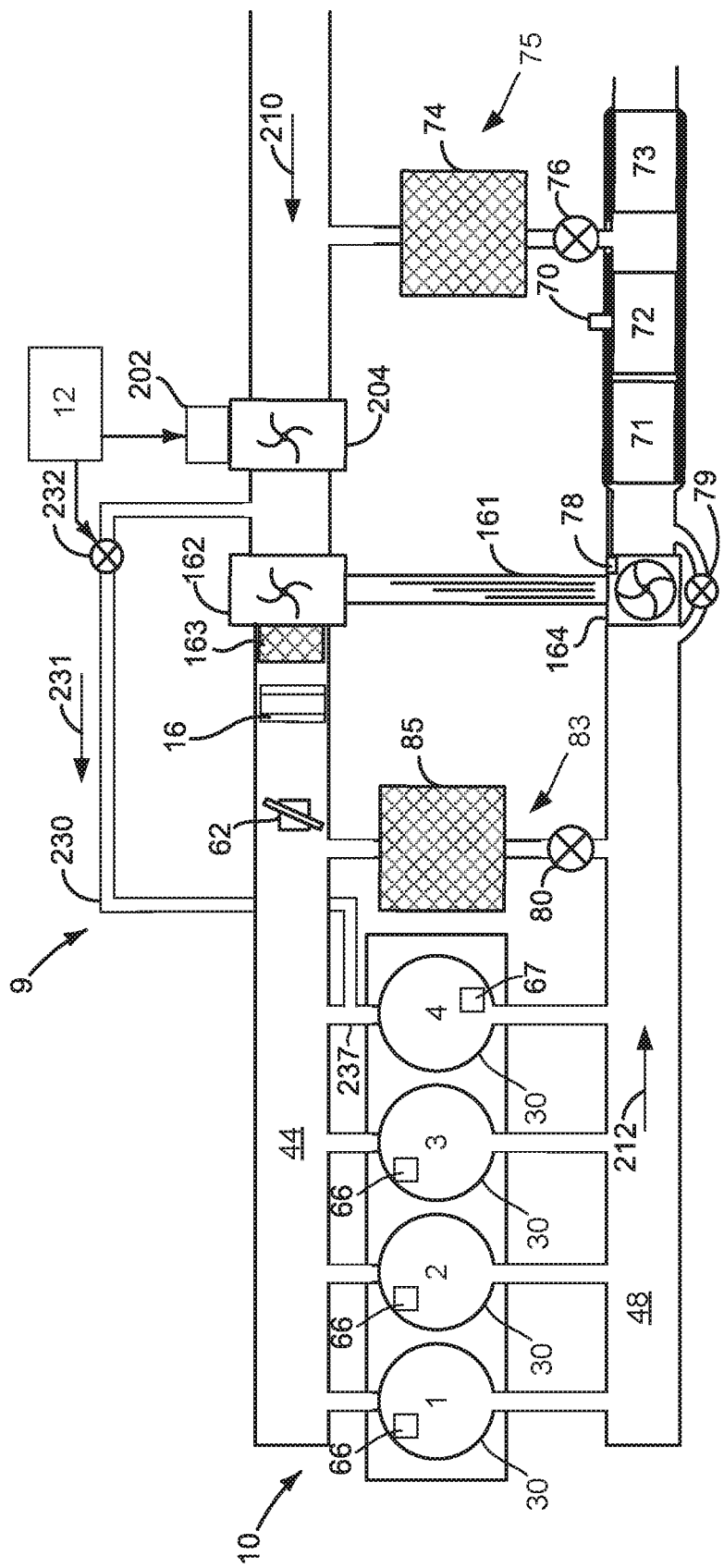

SYSTEM AND METHOD FOR STARTING AN ENGINE

BACKGROUND/SUMMARY

A diesel engine may be stopped and then started when ambient temperatures are cold. The diesel engine may be difficult to start and it may exhibit combustion stability levels that are less than is desired when it is started at low ambient temperatures because low cylinder temperatures may make it more difficult for air-fuel mixtures in engine cylinders to reach ignition temperature. Glow plugs and grid heaters may be utilized to increase temperature within an engine's cylinders, but the engine may still be difficult to start. Further, to reduce engine starting times, more expensive ceramic tip glow plugs may have to be deployed in the engine. As such, the glow plugs and grid heater may increase system cost significantly. Therefore, it may be desirable to provide a way of improving cold engine so that the engine may be started without glow plugs or with lower cost glow plugs.

The inventors herein have recognized the above-mentioned disadvantages and have developed an engine operating method, comprising: adjusting operation of an electric machine that is coupled to a compressor via a controller to generate a predetermined desired temperature in an engine or a predetermined desired pressure in the engine, the predetermined desired temperature and the predetermined desired pressure changing as a function of engine speed and engine load.

By adjusting output of an electric machine that is coupled to a compressor to generate a predetermined temperature or pressure in an engine, it may be possible to operate an engine at lower engine temperatures without assistance from glow plugs and/or grid heaters. Further, because the electric machine is adjusted to provide a predetermined temperature or pressure instead of simply maximizing boost pressure, efficiency of operating the engine may improve. Adjusting the electric machine to provide the predetermined temperature or pressure also helps to ensure that the temperature or pressure in the engine is sufficient to support combustion within the engine and improve combustion stability after the engine is started.

The present description may provide several advantages. In particular, the approach may improve engine starting. In addition, the approach may be applied to a wide variety of engine configurations. Further, the approach may provide different temperatures in an engine for different operating conditions so that engine efficiency may be improved during cold engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
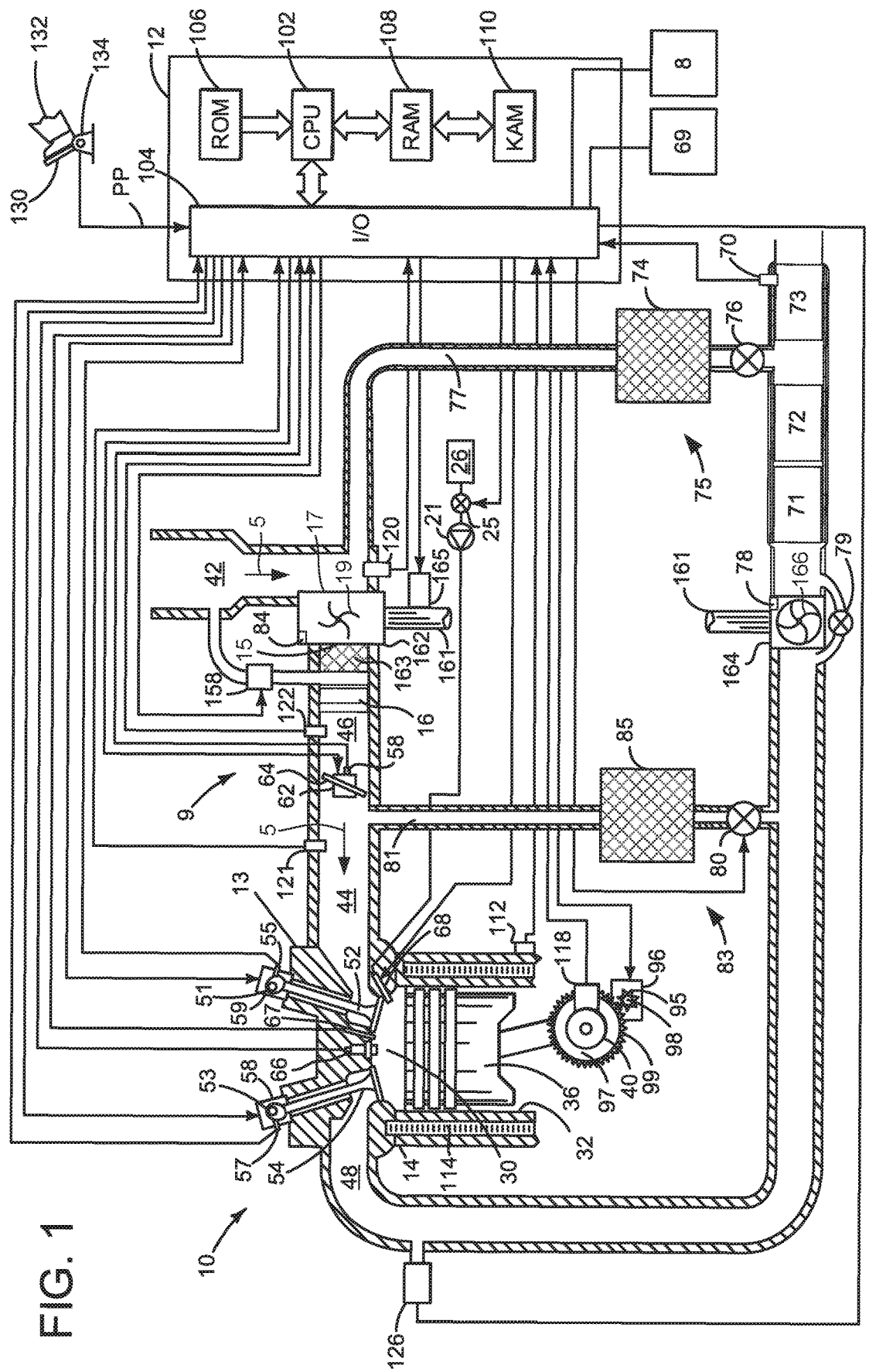
FIG. 1 shows a detailed schematic depiction of an example engine.
Figure 2A:
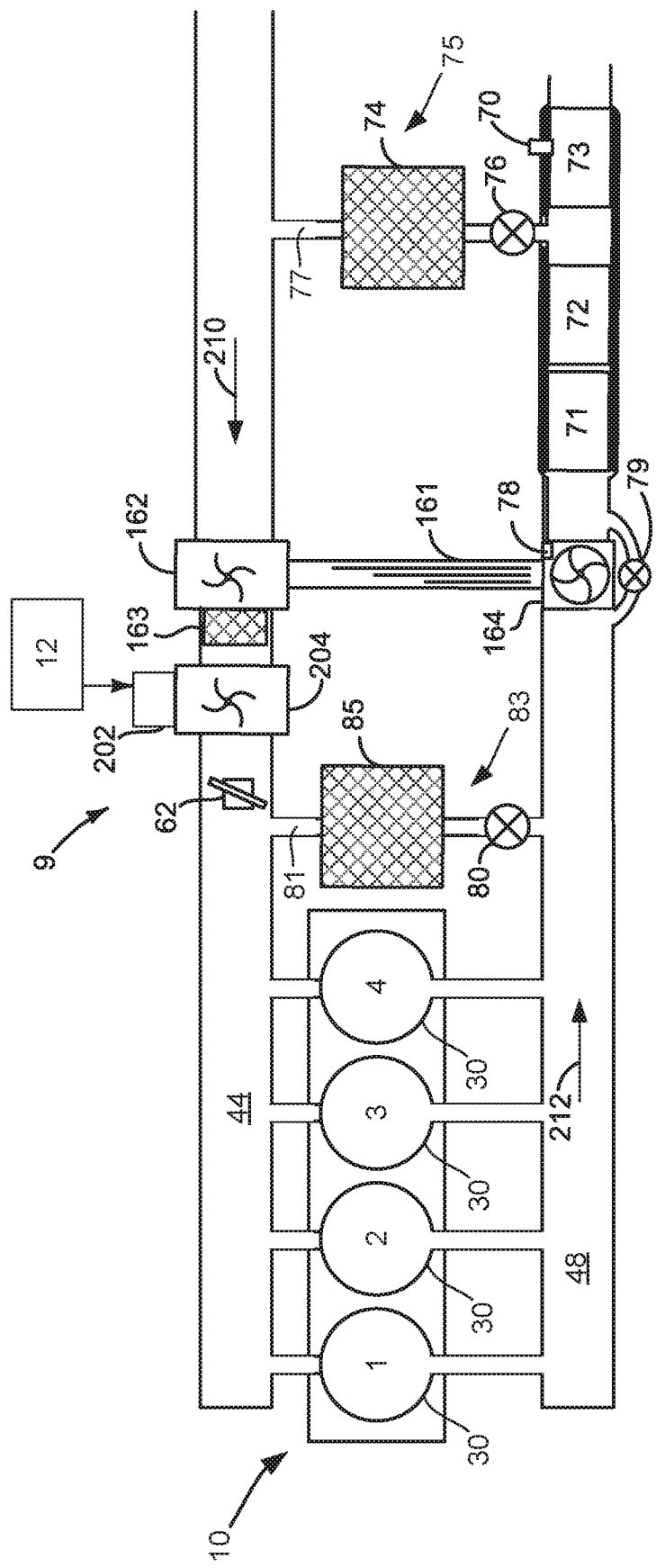
FIGS. 2A-2R show example engine system configurations for improving engine cold starting.
Figure 2R:
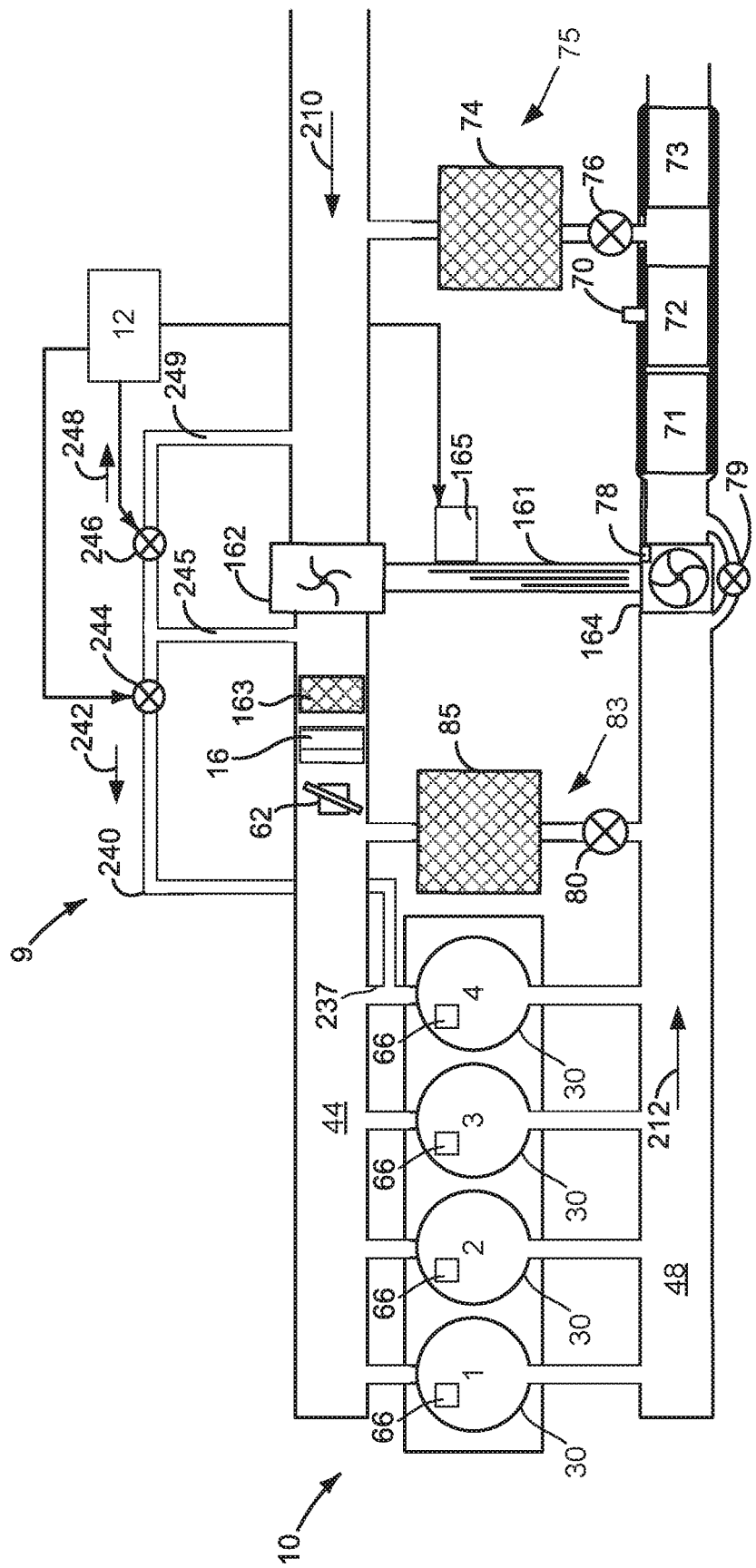
Figure 3:
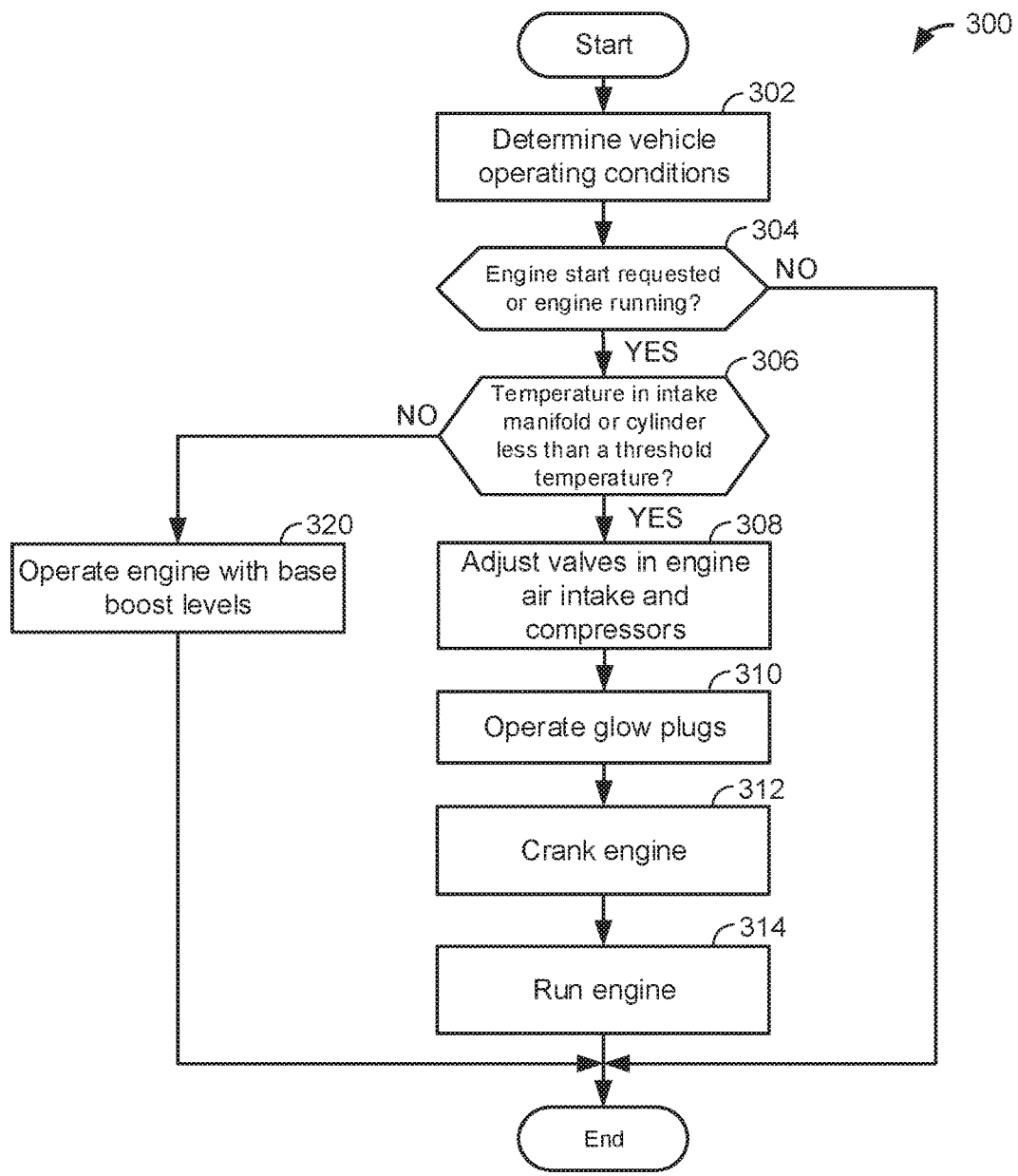
FIG. 3 shows an example method for controlling boost during engine cold starting.
Figure 4:
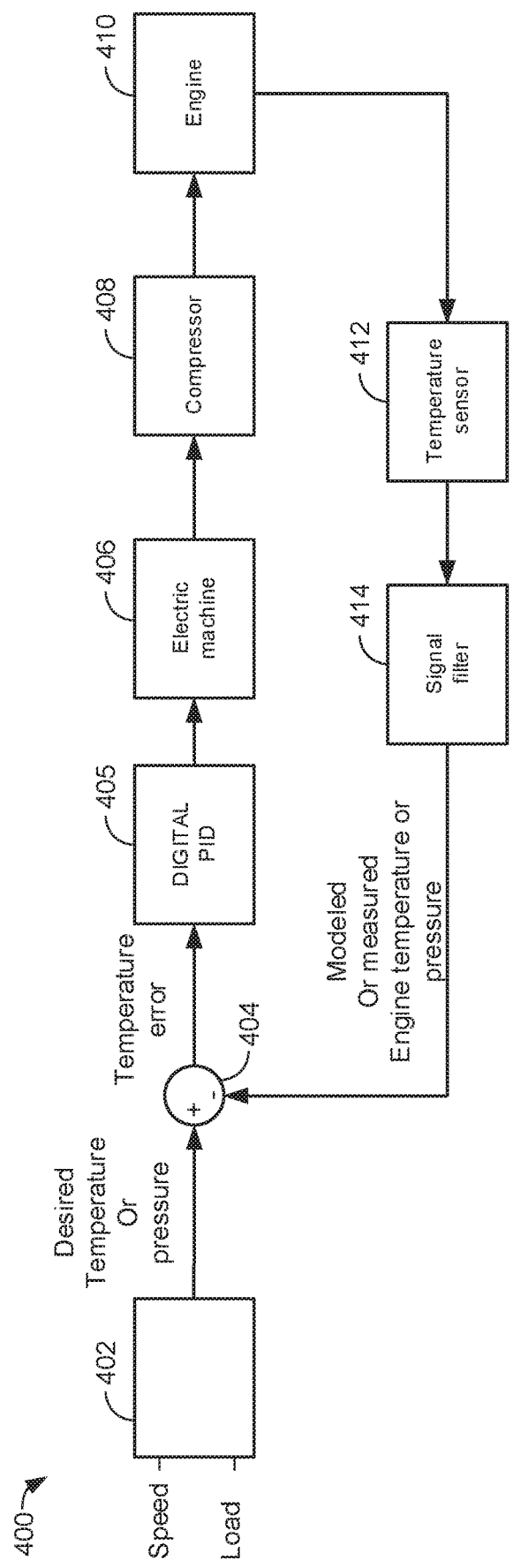
FIG. 4 shows a block diagram for operating an electrically driven compressor.
Figure 5:
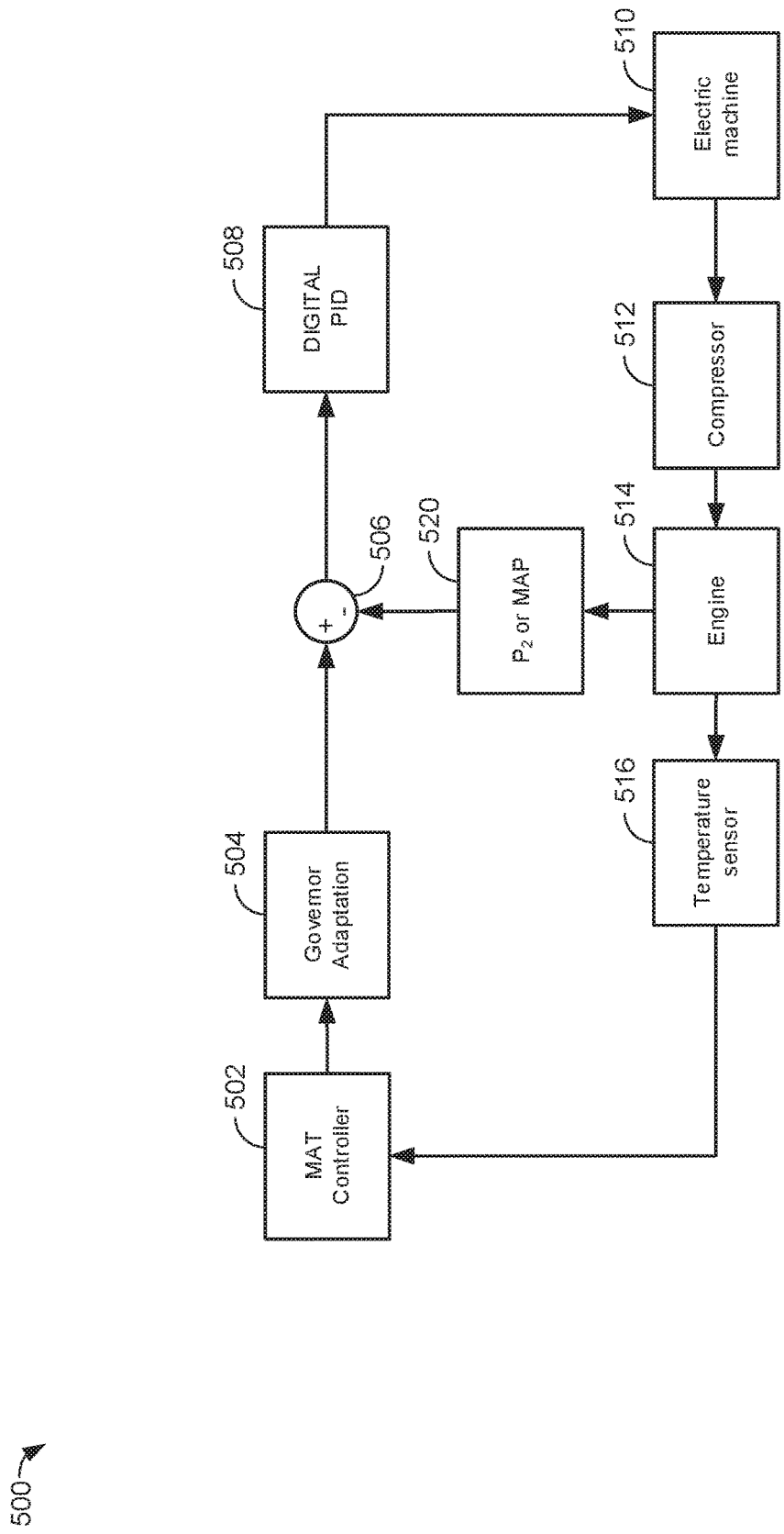
FIG. 5 shows a block diagram for controlling temperature within an engine.
Figure 6A:
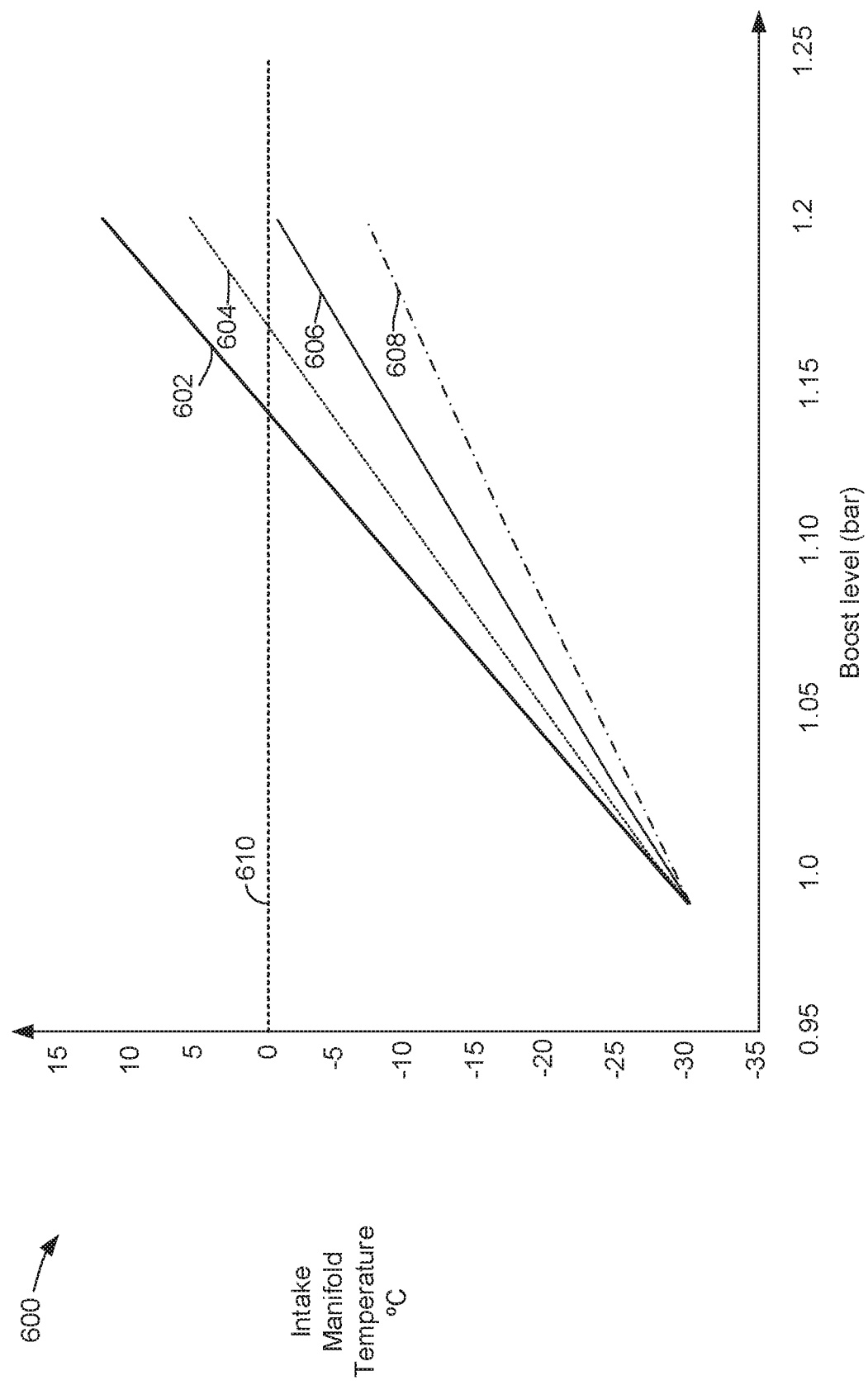
FIGS. 6A and 6B show relationships between boost pressure and engine temperatures.
Figure 6B:
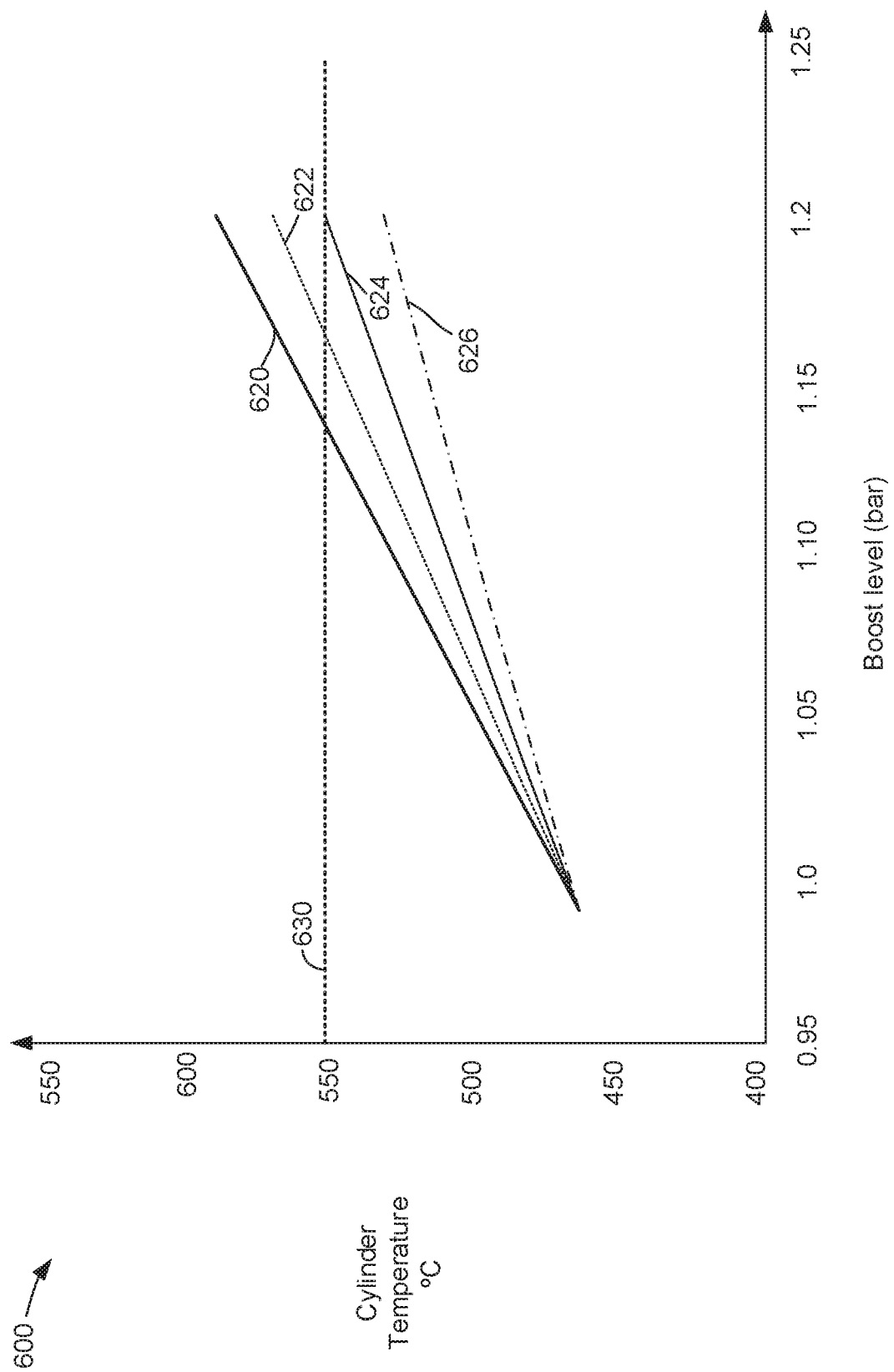
Figure 7:
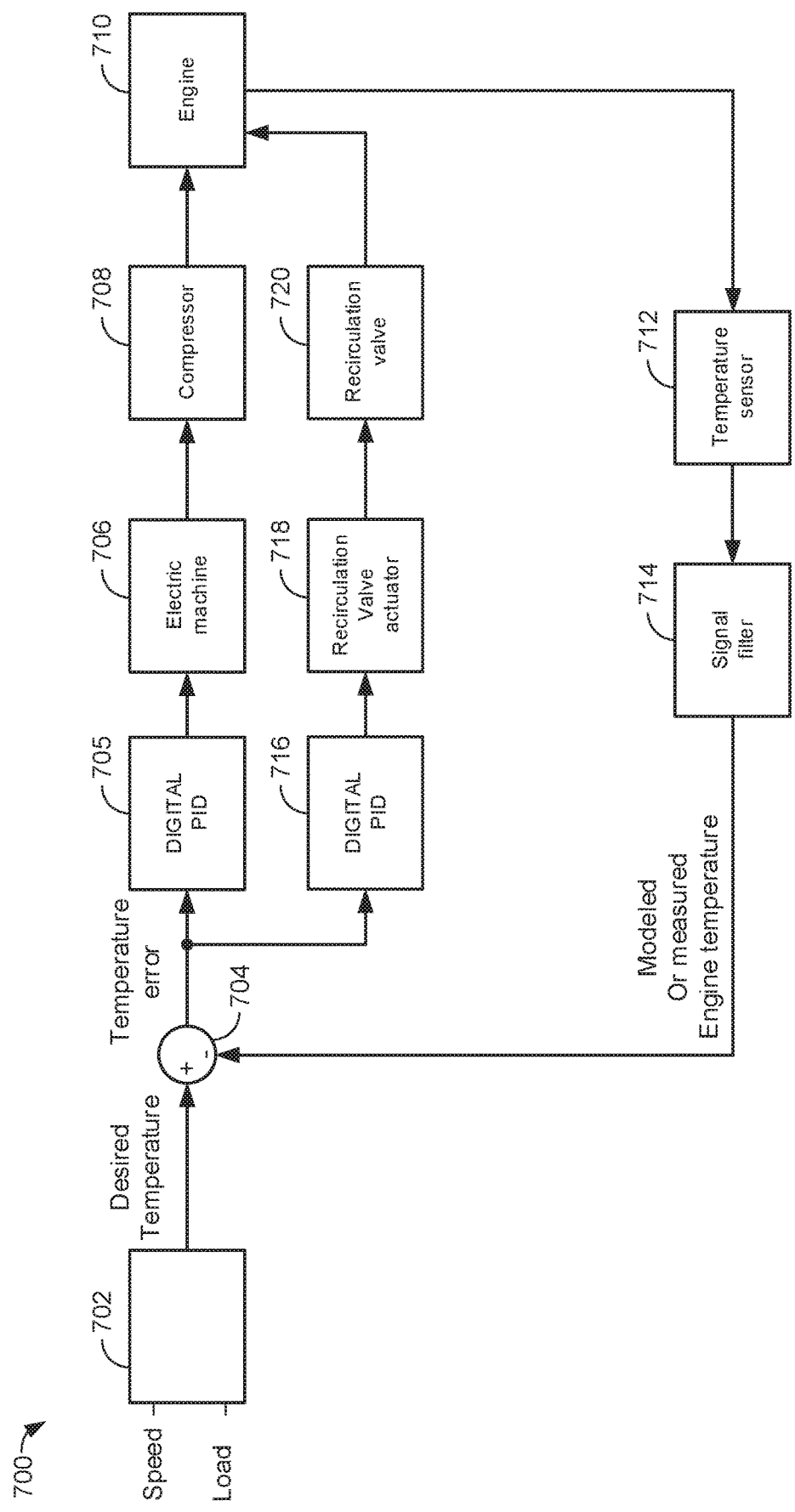
FIG. 7 shows a block diagram for operating an electrically driven compressor and a recirculation valve.
Figure 8:
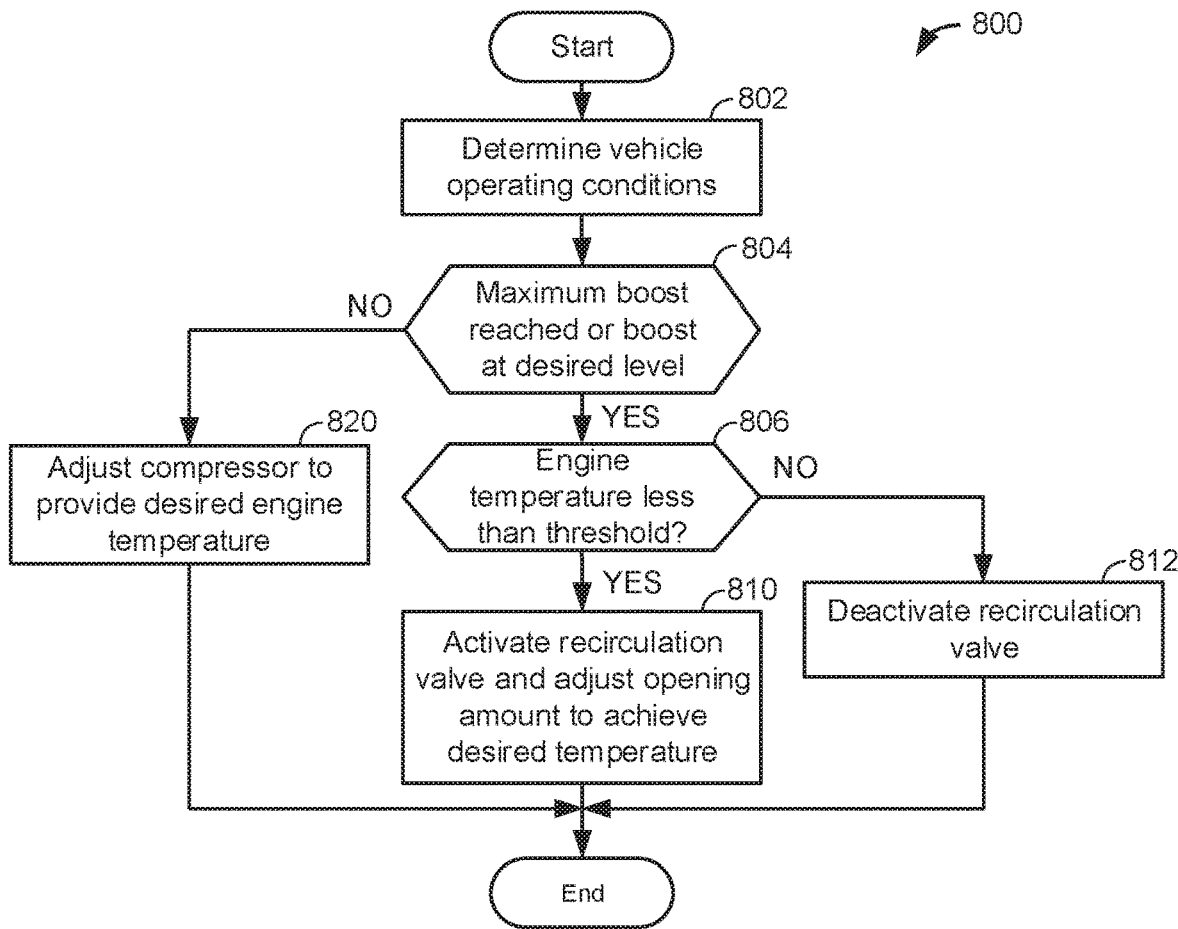
FIG. 8 shows a method for operating a recirculation valve.
Figure 9:
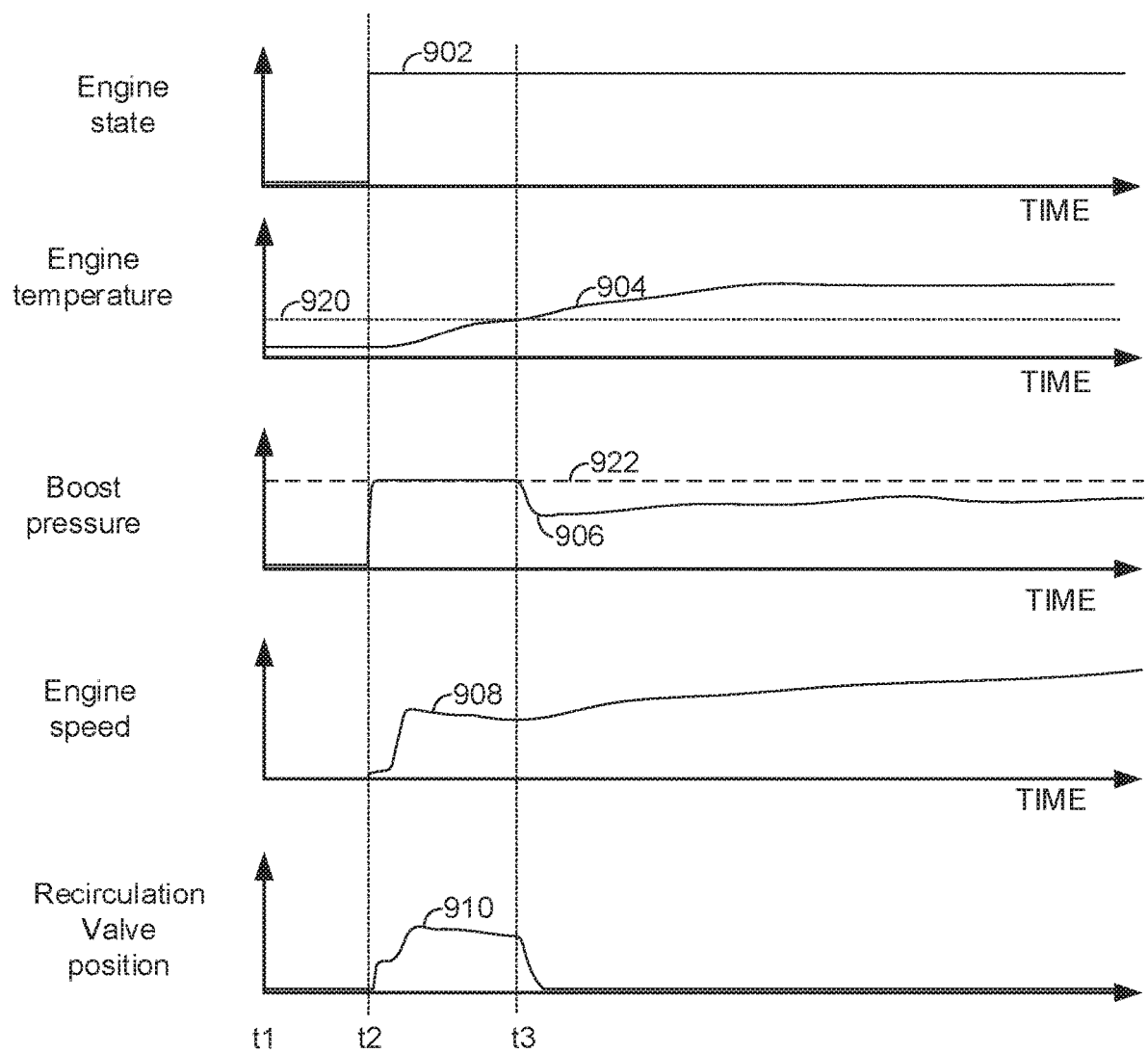
FIG. 9 shows an example engine operating sequence.

The present description is related to operating a diesel engine that may be cold started from time t0 time. FIG. 1 shows one example of an electrically boosted diesel engine. By electrically boosting the engine, it may be possible to provide significant amounts of compressed air to the engine while the engine is stopped and being cranked. The electric boosting device performs work on the air to increase air pressure and air temperature. The higher air temperature may improve engine starting. FIGS. 2A-2R show several example engine configurations where the present invention may be applied. A method for controlling boost during an engine cold start is shown in FIG. 3. FIGS. 4 and 5 show control block diagrams for operating the electrically driven compressor and controlling temperature within an engine. FIGS. 6A and 6B show how increasing an amount of boost supplied to an engine may improve engine cold starting. FIGS. 7 and 8 show how a recirculation valve may be controlled to further improve engine cold starting. A prophetic engine operating sequence is shown in FIG. 9.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Optional electric machine 165 is also shown coupled to shaft 161. Optional electric machine 165 may rotate compressor 162 when engine 10 is not rotating, when engine 10 is rotating at low speed (e.g., cranking speed such as 250 RPM), or when exhaust energy is low to provide additional boost. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and electric machine 165. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via optional pressure sensor 67, alternatively or in addition, sensor 67 may also sense cylinder temperature.

Emissions device 71 can include an oxidation catalyst and it may be followed by a diesel particulate filter (DPF) 72 and a selective catalytic reduction (SCR) catalyst 73, in one example. In another example, DPF 72 may be positioned downstream of SCR 73. Temperature sensor 70 provides an indication of SCR temperature. Exhaust flows in the direction of arrow 7.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. Low pressure EGR system 75 may include an EGR cooler 74.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Engine 10 may be included in a variety of configurations, which are shown in FIGS. 2A-2R. The various engine configurations may include all or only a fraction of the components that are shown in FIG. 1. Further, some of the configurations may include additional components that are not shown in FIG. 1. Numeric labels for engine 10 and its associated components are maintained in FIGS. 2A-2R. Further, components shown in FIG. 1 and that are included in FIGS. 2A-2R operate as described according to FIG. 1 and are labeled with the same numeric labels. Therefore, for the sake of brevity, the description of these elements will not be repeated. In addition, once a new component has been introduced in FIGS. 2A-2R and described, its description will not be repeated for the sake of brevity.

Referring now to FIG. 2A, engine 10 is shown with four individual cylinders 30 that are numbered 1-4. In this example, engine 10 includes an electrically driven compressor 204 that may be rotated via electric machine 202. Electric machine 202 is positioned downstream of turbocharger compressor 162 and it may be selectively activated and deactivated via controller 12. In addition, the speed of electric machine 202 and electrically driven compressor 204 may be controlled and adjusted via controller 12 to control boost pressure. Turbocharger compressor 162 is driven only via turbine 164 and it is not driven via an electric machine. Air flows into engine 10 in the direction of arrow 210 and exhaust flows out of engine 10 in the direction of arrow 212.

In this example configuration, there are no glow plugs and no grid heater. Rather, a speed of electrically driven compressor 204 may be adjusted to pressurize and heat air entering engine 10 so that engine 10 may be cold started without glow plugs and grid heater. Further, this configuration does not include a bypass circuit around charge air cooler 163 because air that is heated via electrically driven compressor 204 enters intake manifold without passing through a charge air cooler. Thus, heat produced compressing air entering engine 10 may be applied during an engine cold start to improve ignition of fuel within engine cylinders. Thus, system cost related to glow plugs and the grid heater may be eliminated and the electrically driven compressor may provide boost to engine 10 when boost is low or not available from compressor 162. Electrical machine 202, which drives electrically driven compressor 204, may be controlled as is described in further detail with reference to FIGS. 3-5, 7, and 8.

Figure 2B:
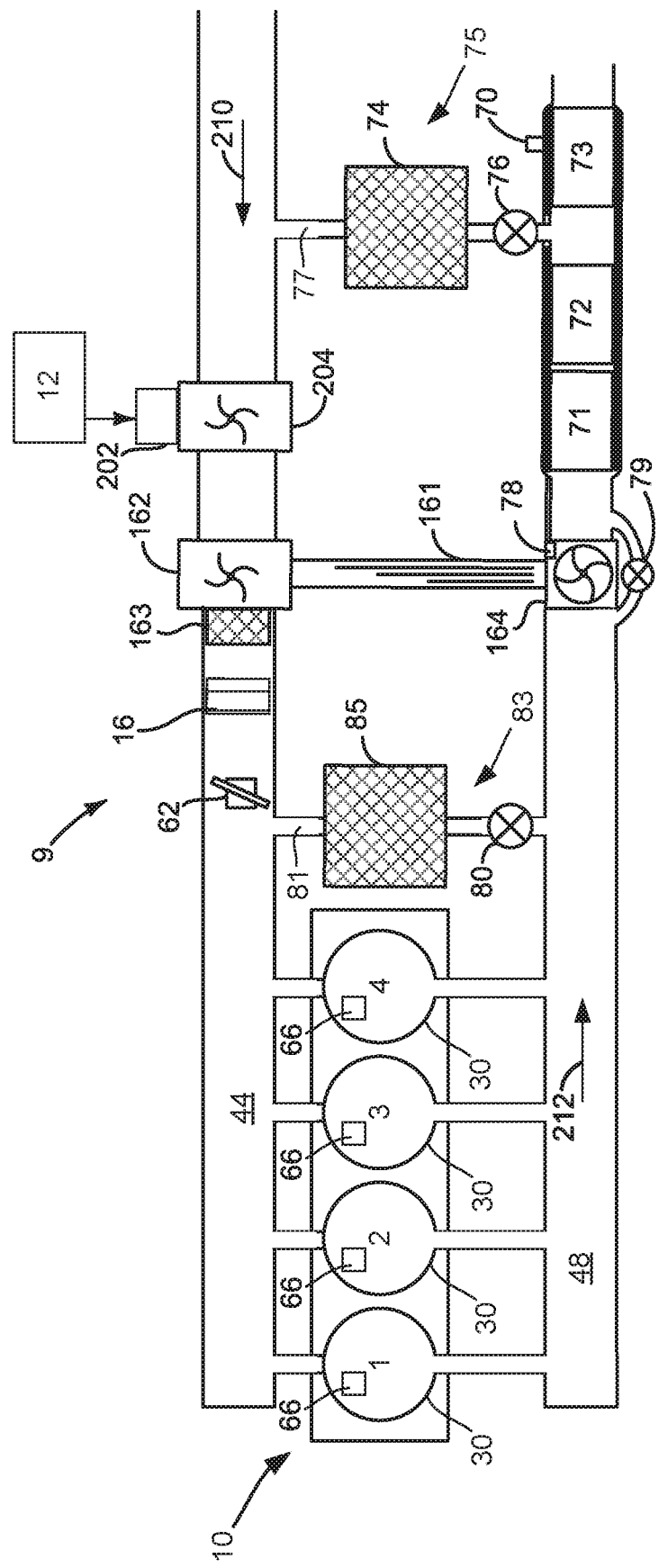

Referring now to FIG. 2B, engine 10 is shown with four individual cylinders 30 that are numbered 1-4. In this example, engine 10 includes an electrically driven compressor 204 that may be rotated via electric machine 202. Electric machine 202 is positioned upstream of turbocharger compressor 162 and it may be selectively activated and deactivated via controller 12. In addition, the speed of electric machine 202 and electrically driven compressor 204 may be controlled and adjusted via controller 12 to control boost pressure. Turbocharger compressor 162 is driven only via turbine 164 and it is not driven via an electric machine. Air flows into engine 10 in the direction of arrow 210 and exhaust flows out of engine 10 in the direction of arrow 212.

In this example configuration, glow plugs 66 and grid heater 16 are provided. The speed of electrically driven compressor 204 may be adjusted to pressurize and heat air entering compressor 162. However, some heat energy may be extracted from the air via charge air cooler 163. Therefore, glow plugs 66 and grid heater 16 may be activated to improve engine cold starting. Because electrically driven compressor 204 may be activated at zero engine rotational speed and during engine cranking, it may be applied to increase a temperature of air entering the engine even if charge air cooler 163 is present. Consequently, engine starting may be improved. Electrical machine 202, which drives electrically driven compressor 204, may be controlled as is described in further detail with reference to FIGS. 3-5, 7, and 8.

Figure 2C:
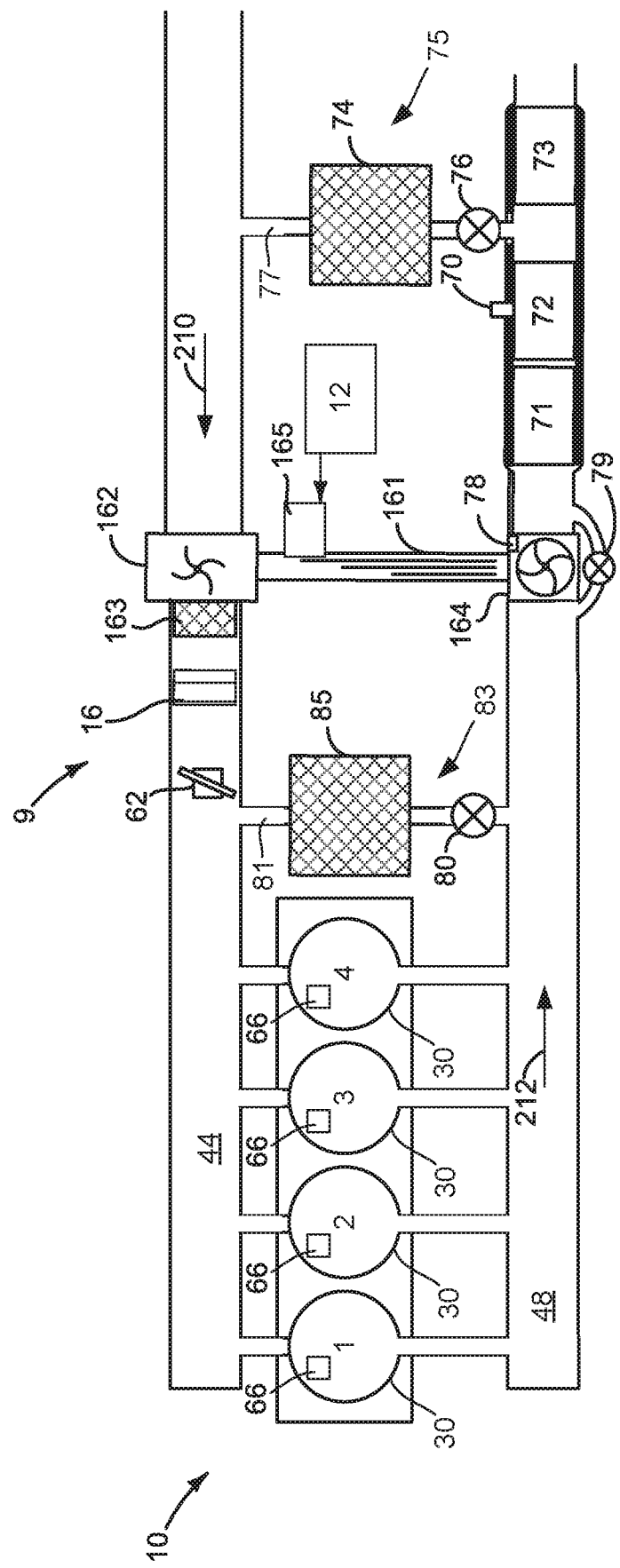

Referring now to FIG. 2C, engine 10 is shown with four individual cylinders 30 that are numbered 1-4. In this example, engine 10 includes an electric machine 165 to rotate turbocharger compressor 162. Turbocharger compressor 162 may also be driven via exhaust gases and turbine 164. The speed of electric machine 165 may be controlled and adjusted via controller 12 to adjust boost pressure. Air flows into engine 10 in the direction of arrow 210 and exhaust flows out of engine 10 in the direction of arrow 212.

In this example configuration, glow plugs 66 and grid heater 16 are provided. The speed of electrically driven compressor 204 may be adjusted to pressurize and heat air entering compressor 162. However, some heat energy may be extracted from the air via charge air cooler 163. Therefore, glow plugs 66 and grid heater 16 may be activated to improve engine cold starting. Because electrically machine 165 may be activated at zero engine rotational speed and during engine cranking, it may be applied to increase a temperature of air entering the engine even if charge air cooler 163 is present. Consequently, engine starting may be improved. Electrical machine 165 may be controlled to drive turbocharger compressor 162 as is described in further detail with reference to FIGS. 3-5, 7, and 8.

Figure 2D:
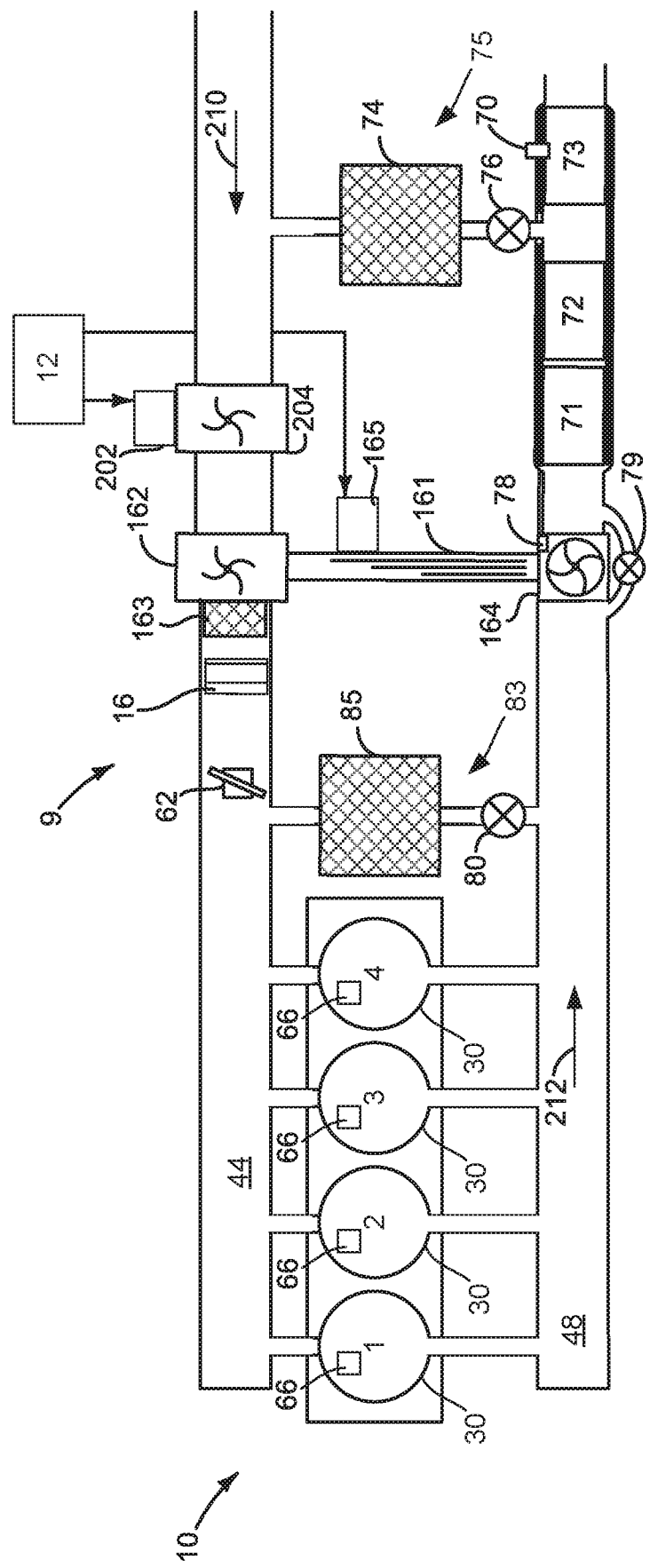

Referring now to FIG. 2D, engine 10 is shown with four individual cylinders 30 that are numbered 1-4. In this example, engine 10 includes an electric machine 165 to rotate turbocharger compressor 162 and an electrically driven compressor 204. The speeds of electric machine 165 and electric machine 202 may be individually controlled and adjusted via controller 12 to adjust boost pressure. Air flows into engine 10 in the direction of arrow 210 and exhaust flows out of engine 10 in the direction of arrow 212.

In this example configuration, glow plugs 66 and grid heater 16 are provided. The speeds of electrically driven compressor 204 and compressor 162 may be adjusted via controller 12 to pressurize and heat air entering compressor 162. However, some heat energy may be extracted from the air via charge air cooler 163. Therefore, glow plugs 66 and grid heater 16 may be activated to improve engine cold starting. Because electrically machine 165 and electrical machine 202 may be activated at zero engine rotational speed and during engine cranking, they may be applied to increase a temperature of air entering the engine even if charge air cooler 163 is present. Consequently, engine starting may be improved. Electrical machine 202, which drives electrically driven compressor 204, and electrical machine 165, which drives turbocharger compressor 162, may be controlled as is described in further detail with reference to FIGS. 3-5, 7, and 8.

Figure 2E:
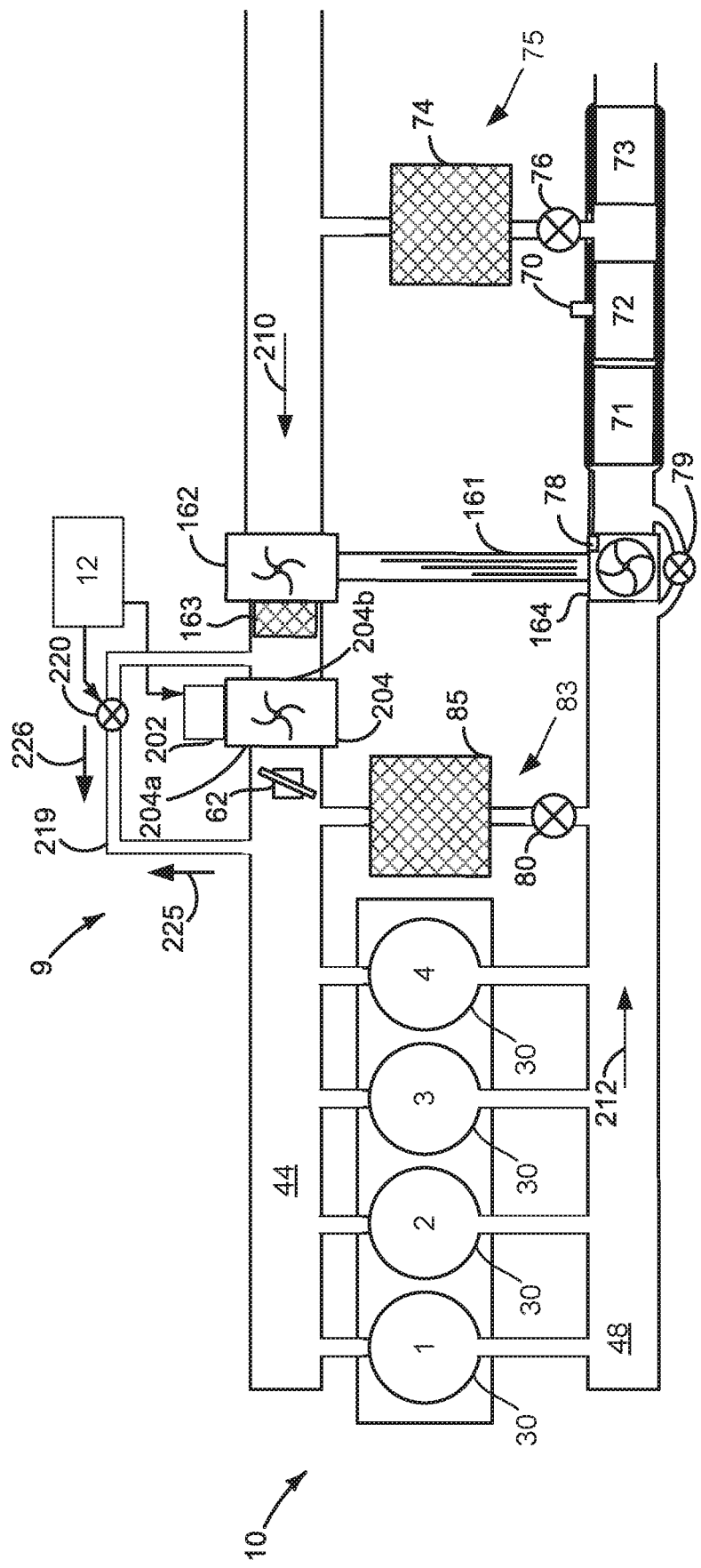

Referring now to FIG. 2E, engine 10 is shown with four individual cylinders 30 that are numbered 1-4. In this example, turbocharger compressor 162 may not be driven by an electrical machine, but electrically driven compressor 204 is provided downstream of turbocharger compressor 162. Electrically driven compressor 204 is straddled via passage 219 which extends from inlet 204b to outlet 204a. Passage 219 includes a valve 220 that may be opened and closed via controller 12. The speed of electric machine 202 may be individually controlled and adjusted via controller 12 to adjust boost pressure. Air flows into engine 10 in the direction of arrow 210 and exhaust flows out of engine 10 in the direction of arrow 212.

Passage 219 selectively allows electrically driven compressor 204 to be bypassed when electrically driven compressor 204 is off (e.g., not consuming electrical energy) and bypass valve 220 is open (e.g., bypass mode). Valve 220 may operate as a bypass valve in a bypass mode when electrically driven compressor is not rotated via electric machine 202 so that only a small air pressure drop may occur across electrically driven compressor 204. Passage 219 may also recirculate air from outlet 204a of electrically driven compressor to inlet 204b of electrically driven compressor when valve 220 is open and when electric machine 202 is rotating electrically driven compressor 204 (e.g., recirculation mode). Thus, valve 220 may operate as a recirculation valve when electrically driven compressor 204 is rotated via electric machine 202. Operating valve 220 in a recirculation mode allows a same air mass to be compressed and heated via electrically driven compressor 204 multiple times, thereby increasing the heat energy of the air. Air flows through passage 219 in the direction indicated by arrow 225 in the recirculation mode, and air flows through passage 219 in the direction indicated by arrow 226 in the bypass mode.

In this example configuration, glow plugs 66 and grid heater 16 are not included, but they may optionally be included. The speeds of electrically driven compressor 204 may be adjusted via controller 12 to pressurize and heat air entering compressor 162. Further, bypass valve 220 may be partially or fully opened to further increase a temperature of air entering engine 10 during engine cold starting. Throttle 62 may be fully opened during an engine cold start so that air may be recirculated back to the input side 204b of electrically driven compressor 204. The air that enters cylinders 30 may be at a higher temperature when recirculation valve 220 is open as compared to if recirculation valve 220 is not opened. Consequently, engine starting may be improved. Electrical machine 202, which drives electrically driven compressor 204, may be controlled as is described in further detail with reference to FIGS. 3-5, 7, and 8.

Figure 2F:
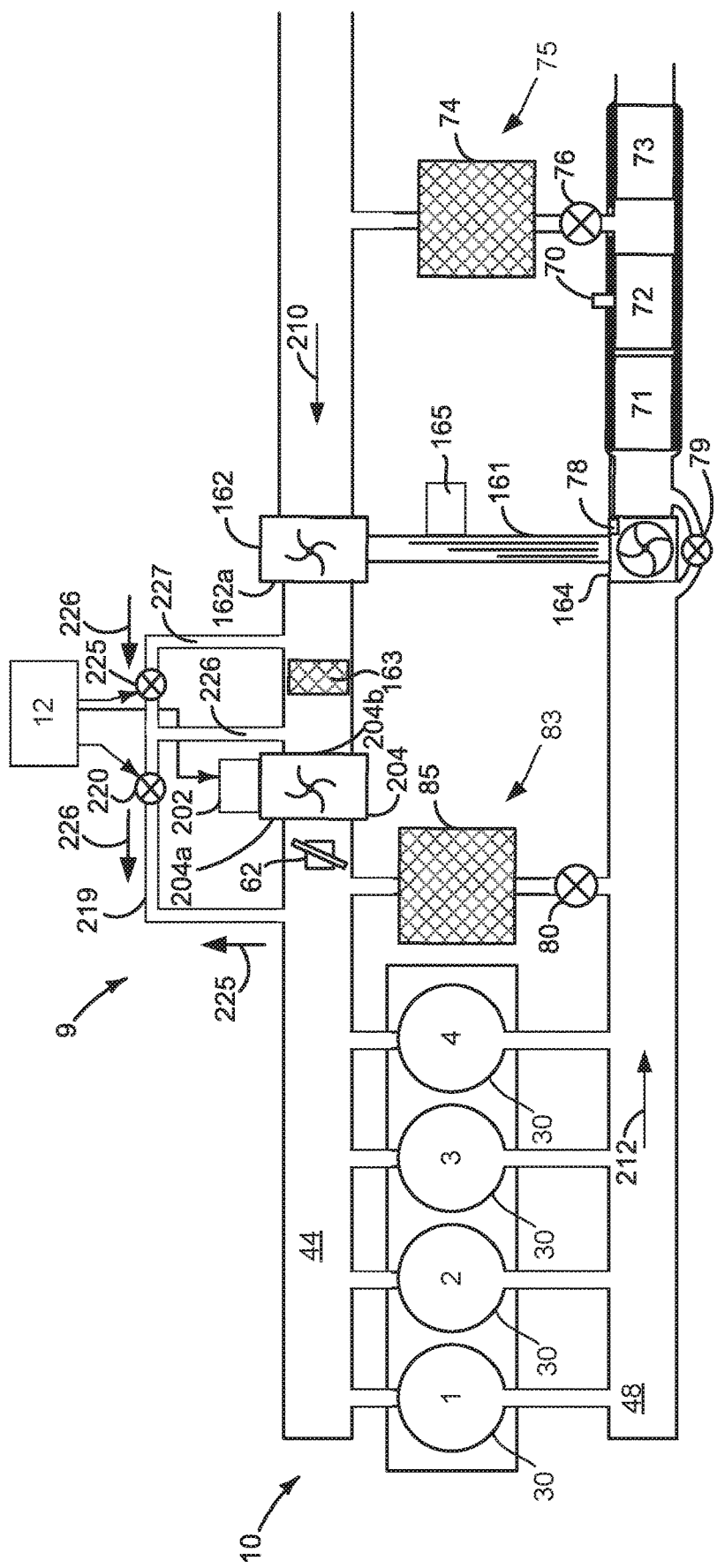

Referring now to FIG. 2F, engine 10 is shown with four individual cylinders 30 that are numbered 1-4. In this example, electric machine 165 is provided to rotate turbocharger compressor 162 and electric machine 202 is provided to rotate electrically driven compressor 204. The speeds of electric machine 202 and electrical machine 165 may be individually controlled and adjusted via controller 12 to adjust boost pressure. Electrically driven compressor 204 is straddled by passages 219 and 226. Passage 219 includes valve 220. Charge air cooler 163 is straddled by passage 226 and passage 227. Passage 227 includes valve 225. Air flows into engine 10 in the direction of arrow 210 and exhaust flows out of engine 10 in the direction of arrow 212.

Passage 219 selectively allows electrically driven compressor 204 to be bypassed when electrically driven compressor 204 is off (e.g., not consuming electrical energy) and bypass valve 220 is open (e.g., bypass mode). Valve 220 may operate as a bypass valve in a bypass mode when electrically driven compressor is not rotated via electric machine 202 so that only a small air pressure drop may occur across electrically driven compressor 204. Passage 219 may also recirculate air from outlet 204a of electrically driven compressor to inlet 204b of electrically driven compressor when valve 220 is open and when electric machine 202 is rotating electrically driven compressor 204 (e.g., recirculation mode). Thus, valve 220 may operate as a recirculation valve when electrically driven compressor 204 is rotated via electric machine 202. Operating valve 220 in a recirculation mode allows a same air mass to be compressed and heated via electrically driven compressor 204 multiple times, thereby increasing the heat energy of the air. Air flows through passage 219 in the direction indicated by arrow 225 in the recirculation mode, and air flows through passage 219 in the direction indicated by arrow 226 in the bypass mode.

Passage 227 selectively allows charge air cooler 163 to be bypassed when engine 10 is cold started so that air pressurized and warmed by turbocharger compressor 162 may be pressurized and heated by electrically driven compressor 204 such that air may be heated in stages. Staged air heating includes closing valve 220 and opening valve 225 so that air heated by turbocharger compressor 162 bypasses charge air cooler 163 and then enters inlet 204b of electrically driven compressor 204 without passing through passage 219 and charge air cooler 163. Further, staged air heating includes activating electrically driven compressor 204 to heat air a second time since the air initially entered the engine and before the air enters engine cylinders. After the engine reaches a desired temperature, electrically driven compressor 204 may be deactivated (e.g., no longer supplied with electrical power), valve 220 may be opened, and valve 225 may be closed so that cooled air enters cylinders 30 and bypasses electrically driven compressor 204.

In this example configuration, glow plugs 66 and grid heater 16 are not included, but they may be included optionally. The speeds of electrically driven compressor 204 and turbocharger compressor 162 may be adjusted via controller 12 to pressurize and heat air entering engine cylinders 30. Throttle 62 may be fully opened during an engine cold start so that heated air may be sent directly to intake manifold 44. By heating air entering the engine via two different compressors, it may be possible to reliably cold start the engine without glow plugs and a heating grid. Electrical machine 202, which drives electrically driven compressor 204, and electrical machine 165, which drives turbocharger compressor 162, may be controlled as is described in further detail with reference to FIGS. 3-5, 7, and 8.

Figure 2G:
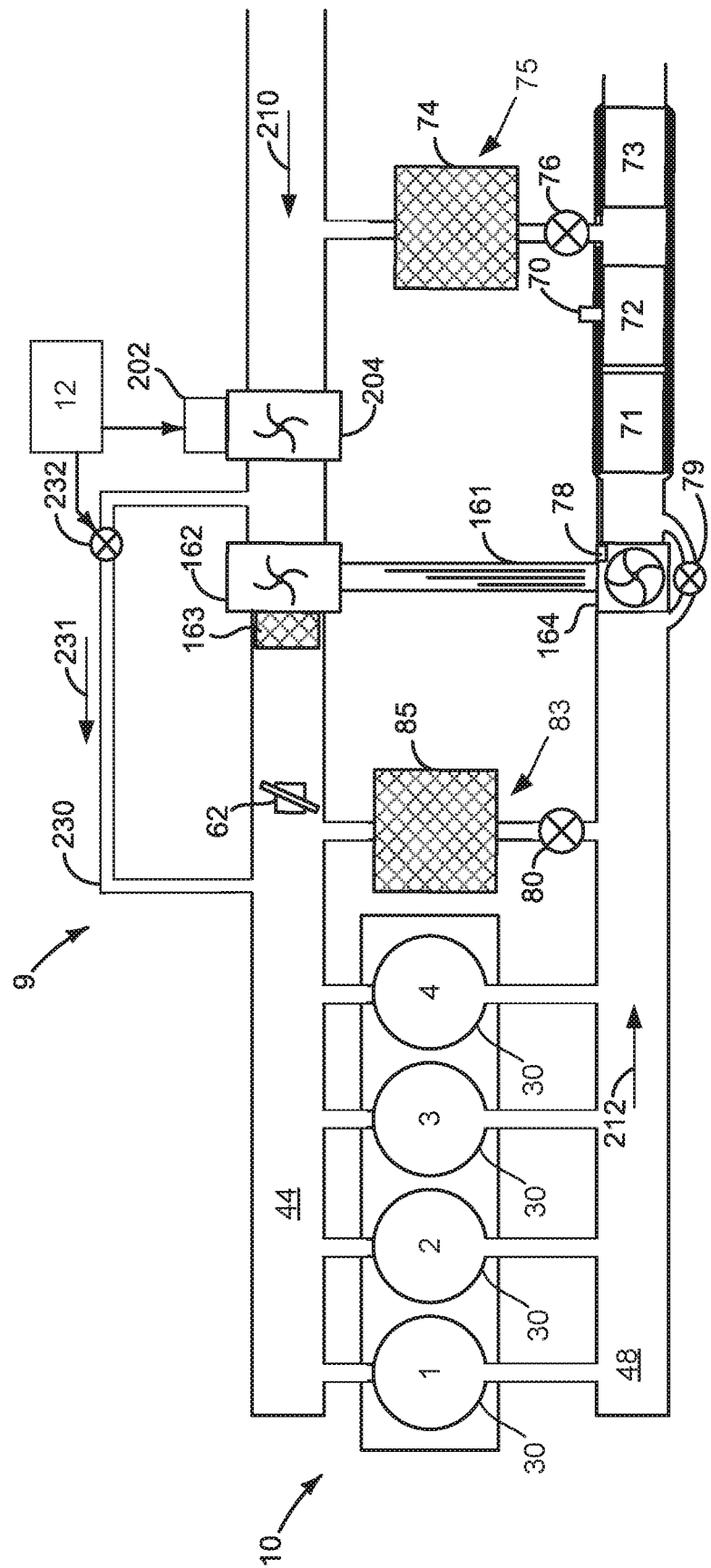

Referring now to FIG. 2G, engine 10 is shown with four individual cylinders 30 that are numbered 1-4. In this example, turbocharger compressor 162 is not driven via an electrical machine, but electrically driven compressor 204 is provided upstream of turbocharger compressor 162. Turbocharger compressor 162 is straddled via passage 230. Passage 230 includes a valve 232 that may be opened and closed via controller 12. The speed of electric machine 202 may be adjusted via controller 12 to adjust boost pressure. Air flows into engine 10 in the direction of arrow 210 and exhaust flows out of engine 10 in the direction of arrow 212.

Passage 230 selectively allows electrically driven compressor 204 to supply pressurized and heated air to cylinders 30 without the air having to pass through turbocharger 162 when electrically driven compressor 204 is on (e.g., consuming electrical energy) and bypass valve 232 is open (e.g., bypass mode). Thus, it may be possible to avoid cooling air since the air does not have to pass through charge air cooler 163. Valve 232 may operate as a bypass valve in a bypass mode when electrically driven compressor is rotated via electric machine 202 during engine cold starts. Air flows through passage 232 in the direction indicated by arrow 231 in the bypass.

In this example configuration, glow plugs 66 and grid heater 16 are not included since electrically driven compressor 204 may pressurize and heat air entering engine 10. The speeds of electrically driven compressor 204 may be adjusted via controller 12 to pressurize and heat air entering compressor 162. Further, bypass valve 232 may be fully opened so that heated air flows around charge air compressor 163 and turbocharger compressor 162. Throttle 62 may be fully closed during an engine cold start so that air flow may be restricted through charge air cooler 163. The air that enters cylinders 30 may be at a higher temperature when bypass valve 232 is open. Consequently, engine starting may be improved. Electrical machine 202, which drives electrically driven compressor 204, may be controlled as is described in further detail with reference to FIGS. 3-5, 7, and 8.

Figure 2H:
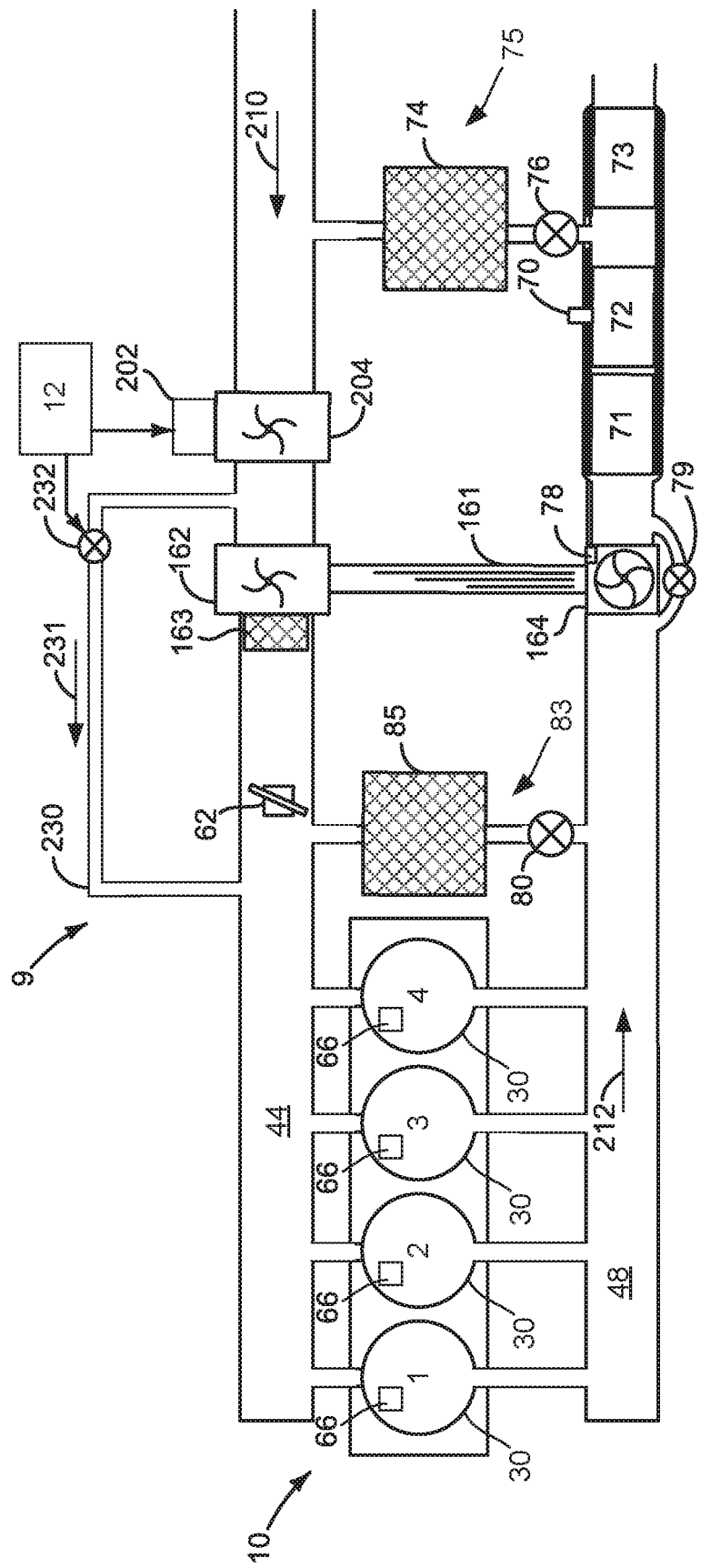

Referring now to FIG. 2H, engine 10 is shown in the same configuration as it is shown in FIG. 2G, but glow plugs are included in this configuration. Glow plugs 66 may be of a metallic composition that does not include a ceramic tip. The metallic composition glow plugs may reduce system cost while still allowing air in engine cylinders to be heated via the glow plugs. The metallic glow plugs may further increase a temperature of air in the cylinders so that the engine may be configured with a lower compression ratio (e.g., 15:1) during engine cold starts. Valve 232 and passage 230 may be operated as previously described. Air may flow through passage 230 in the direction of arrow 231 when valve 232 is open. Electrical machine 202, which drives electrically driven compressor 204, may be controlled as is described in further detail with reference to FIGS. 3-5, 7, and 8.

Figure 2I:
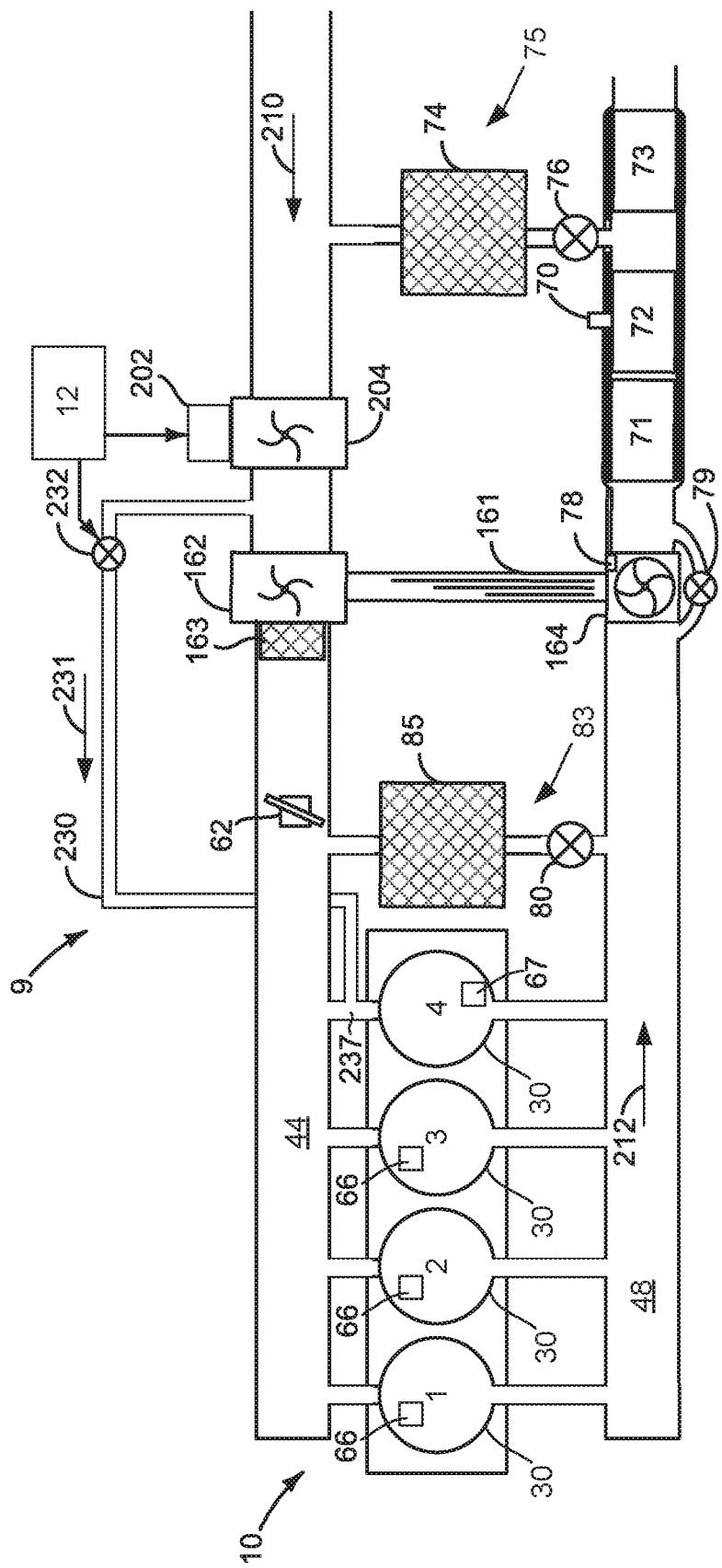

Referring now to FIG. 2I, engine 10 is shown in the same configuration as it is shown in FIG. 2H, but cylinder number four does not include a glow plug and passage 230 is input directly into intake runner 237 of cylinder number four. Note that passage 230 may be coupled to an intake runner of a different cylinder in other examples. Glow plugs 66 may be activated (e.g., supplied with electrical power) to support combustion in three engine cylinders while electrically driven compressor 204 supplies pressurized heated air to cylinder number four during a cold engine start. This configuration may increase the heat energy supplied to cylinder number four as compared to the configuration shown in FIG. 2H since all of the air supplied by electrically driven compressor 204 is directed solely to cylinder number four. Consequently, combustion in cylinder number four may be improved. Combustion in cylinder numbers one through three may not be as stable as combustion in cylinder number four, but cylinder number four may act to make noise and vibration that may result from combustion in cylinders one through three less noticeable. Cylinder number four includes pressure sensor 67 to provide combustion feedback to controller 12. Valve 232 and passage 230 may be operated as previously described. Air may flow through passage 230 in the direction of arrow 231 when valve 232 is open. Electrical machine 202, which drives electrically driven compressor 204, may be controlled as is described in further detail with reference to FIGS. 3-5, 7, and 8.

Referring now to FIG. 2J, engine 10 is shown in the same configuration as it is shown in FIG. 2I, but this configuration includes a grid heater 16 to improve combustion stability and engine cold starting. Glow plugs 66 and grid heater 16 may be activated (e.g., supplied with electrical power) to support combustion in three engine cylinders while electrically driven compressor 204 supplies pressurized heated air to cylinder number four during a cold engine start. This configuration may increase the heat energy supplied to cylinder numbers one through three as compared to the configuration shown in FIG. 2I. Consequently, combustion in cylinder numbers one through three may be improved. Valve 232 and passage 230 may be operated as previously described. Air may flow through passage 230 in the direction of arrow 231 when valve 232 is open. Air flows into engine 10 in the direction of arrow 210 and exhaust flows out of engine 10 in the direction of arrow 212. Electrical machine 202, which drives electrically driven compressor 204, may be controlled as is described in further detail with reference to FIGS. 3-5, 7, and 8.

Figure 2K:
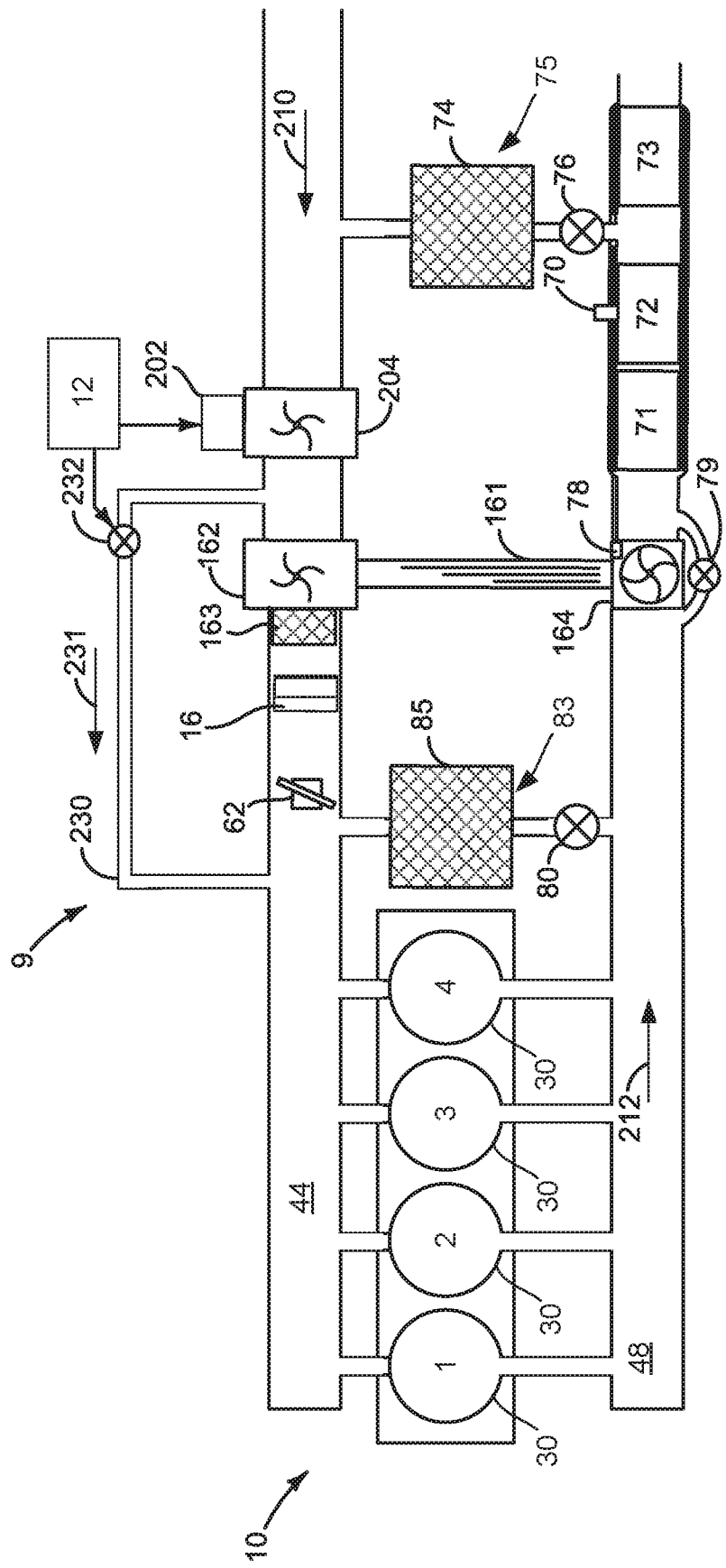

Referring now to FIG. 2K, engine 10 is shown in the same configuration as it is shown in FIG. 2H, but this configuration includes a grid heater 16 and it does not include glow plugs. Grid heater 16 may be activated (e.g., supplied with electrical power) and air may flow through the grid heater to support combustion in all engine cylinders while at the same time (e.g., contemporaneously) electrically driven compressor 204 supplies pressurized heated air to all engine cylinders via passage 230 and valve 232. Thus, a portion of air entering the engine during cold starting may pass through the grid heater 16 without passing through passage 230 and a portion air entering the engine during cold starting may enter engine cylinders by passing through passage 230 without passing through grid heater 16. The amount of heated air at a desired air temperature may be increased via passing air through the grid heater and passage 230. Further, grid heaters may take up to 75 seconds to reach full operating temperature. During such a period, air may be directed solely through passage 230 until the grid heater reaches a threshold temperature, then air may start to flow through passage 230 and the grid heater to support higher engine speeds and loads. Further, by not passing air over the grid heater until the grid heater is at a threshold temperature, the amount of time it takes for the grid heater to reach operating temperature may be reduced. Additionally, the temperature of air entering the engine may be increased. Valve 232 and passage 230 may be operated as previously described. Air may flow through passage 230 in the direction of arrow 231 when valve 232 is open. Electrical machine 202, which drives electrically driven compressor 204, may be controlled as is described in further detail with reference to FIGS. 3-5, 7, and 8.

Figure 2L:
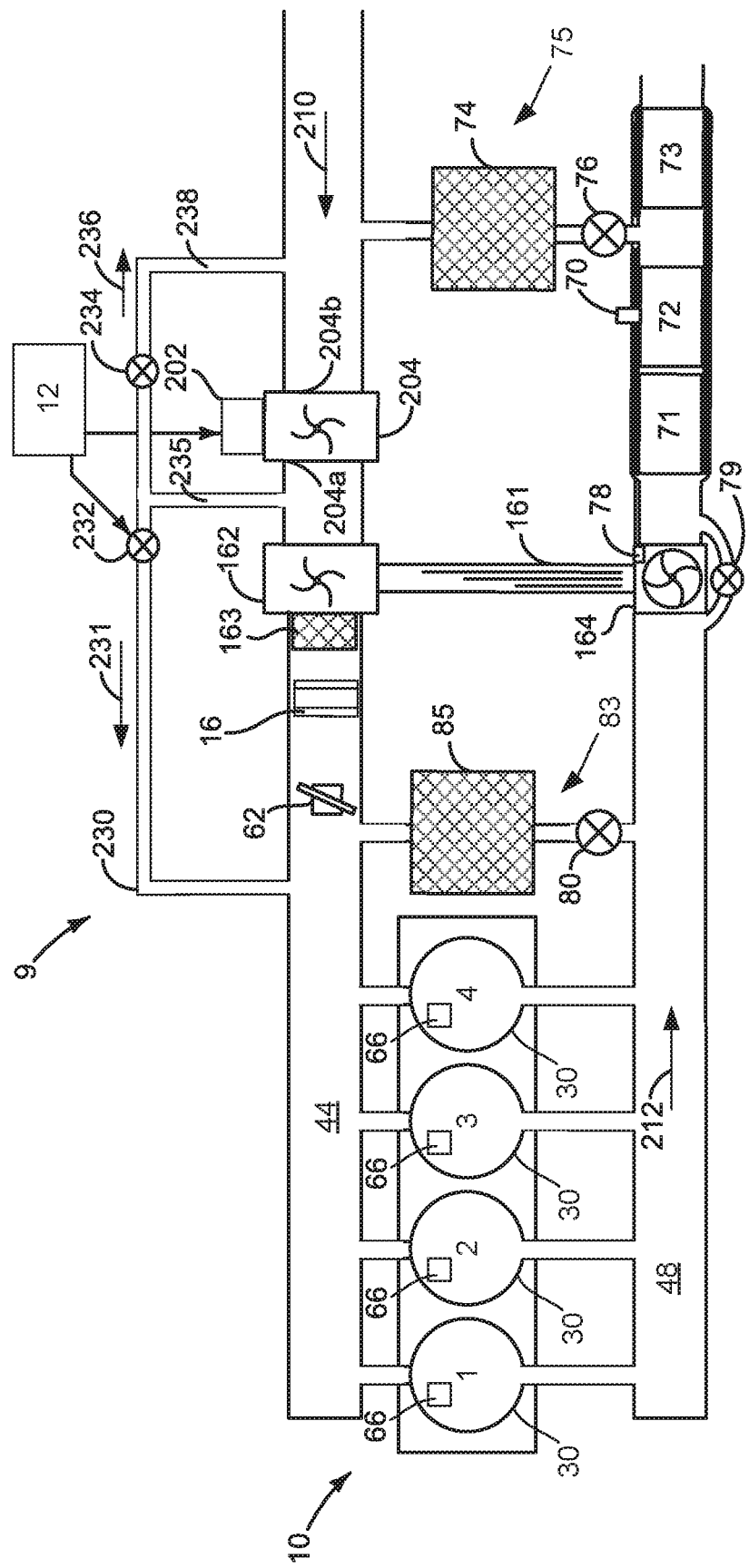

Referring now to FIG. 2L, engine 10 is shown in the same configuration as it is shown in FIG. 2K, but this configuration includes passage 238 and valve 234. Further, air may travel through passage 235 to enter passage 230 and passage 238. During an engine cold start, electrically driven compressor 204 is rotated via electric machine 202. Air enters inlet 204b of electrically driven compressor 204 in the direction indicated by arrow 210 and air travels from outlet 204a of electrically driven compressor into passage 235 where a first portion of the air is directed to valve 232 and a second portion of the air is directed to valve 234. Valve 232 is at least partially open and air flows through passage 230 in the direction of arrow 231. Air flowing through passage 230 enters engine cylinders 30. Valve 234 is also at least partially open and air flows through passage 238 from passage 235 in the direction of arrow 236. Air flowing through passage 238 is returned to inlet 204b of electrically driven compressor 204. Air exiting electrically driven compressor 24 is pressurized and heated. The second portion of air traveling through passage 238 is pressurized a second time and heated a second time when it is returned to inlet 204b and passes through electrically driven compressor 204. Consequently, air that enters passage 230 may achieve a higher temperature as compared to if at least a portion of air is not returned to electrically driven compressor 204. Glow plugs 66 may be included with engine 10 or they may be omitted. If glow plugs 66 are included with engine 10, they may be of a metallic type to reduce system cost. Further, grid heater 12 may be included with engine 10 and it may also be activated during engine cold starting. Consequently, during very cold ambient temperatures, engine 10 may start and have a desired level of combustion stability. Electrical machine 202, which drives electrically driven compressor 204, may be controlled as is described in further detail with reference to FIGS. 3-5, 7, and 8.

Figure 2M:
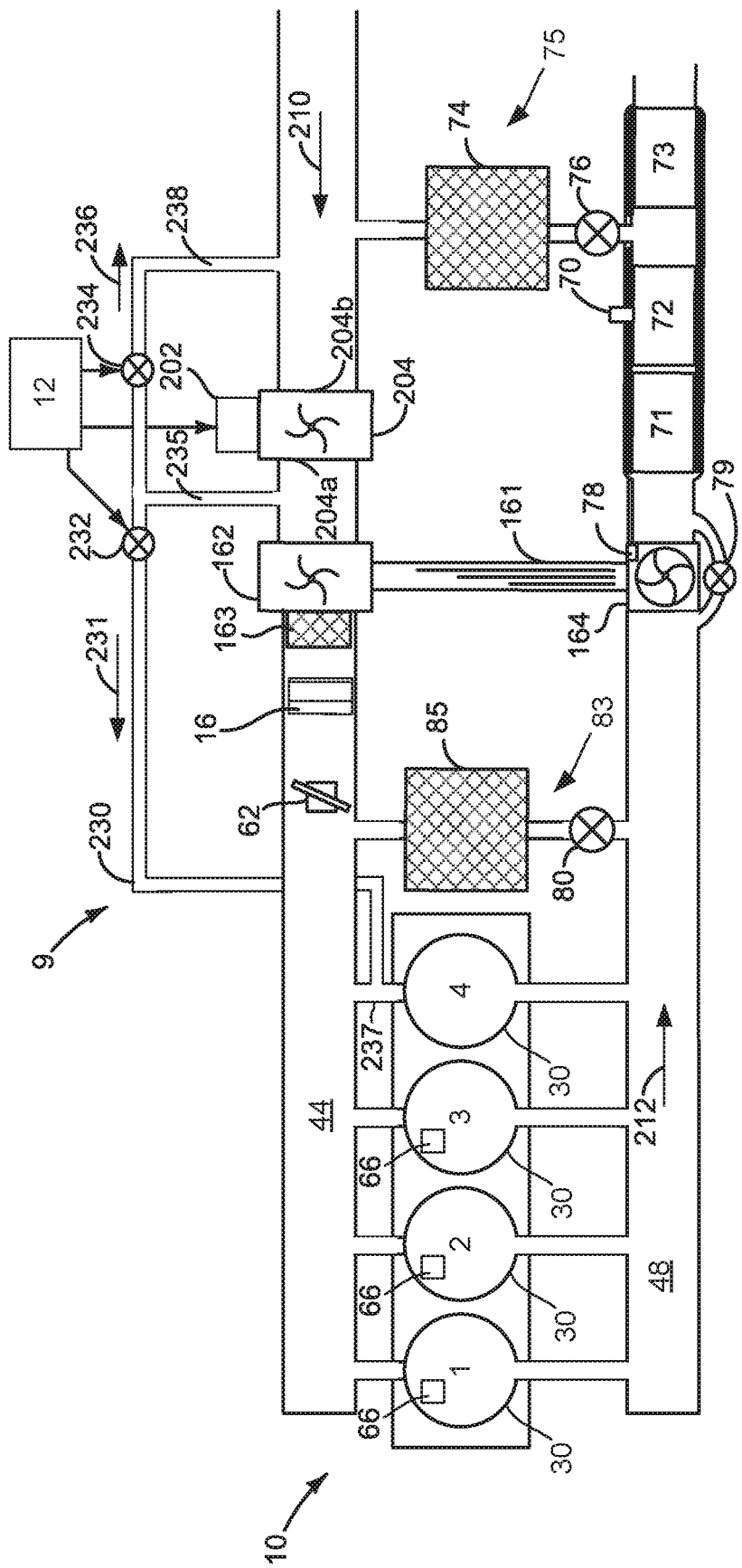

Referring now to FIG. 2M, engine 10 is shown in the same configuration as it is shown in FIG. 2L, but this configuration routes passage 230 to only a single cylinder (cylinder number four) via intake runner 237. During an engine cold start, electrically driven compressor 204 is rotated via electric machine 202. Air enters inlet 204b of electrically driven compressor 204 in the direction indicated by arrow 210 and air travels from outlet 204a of electrically driven compressor into passage 235 where a first portion of the air is directed to valve 232 and a second portion of the air is directed to valve 234. Valve 232 is at least partially open and air flows through passage 230 in the direction of arrow 231. Air flowing through passage 230 enters cylinder number four. Valve 234 is also at least partially open and air flows through passage 238 from passage 235 in the direction of arrow 236. Air flowing through passage 238 is returned to inlet 204b of electrically driven compressor 204. Air exiting electrically driven compressor 204 is pressurized and heated. The second portion of air traveling through passage 238 is pressurized a second time and heated a second time when it is returned to inlet 204b and passes through electrically driven compressor 204. Consequently, air that enters passage 230 may achieve a higher temperature as compared to if at least a portion of air is not returned to electrically driven compressor 204.

During a cold engine start, air also exits electrically driven compressor 204 and it enters turbocharger compressor 162. Air exiting turbocharger compressor 162 is travels through charge air cooler 163 and grid heater 16. Grid heater 16 is activated and it heats the air that is provided to cylinders 1-3. Glow plugs 66 may be included with engine 10 or they may be omitted. If glow plugs 66 are included with engine 10, they may be of a metallic type to reduce system cost. In this example, the glow plug for the cylinder that passage 230 routes air to is omitted because air temperatures in passage 230 are higher. Thus, this configuration concentrates heated air that is delivered to a single cylinder so that cylinder may have improved combustion as compared to if passage 230 provided heat to all engine cylinders. Electrical machine 202, which drives electrically driven compressor 204, may be controlled as is described in further detail with reference to FIGS. 3-5, 7, and 8.

Figure 2N:
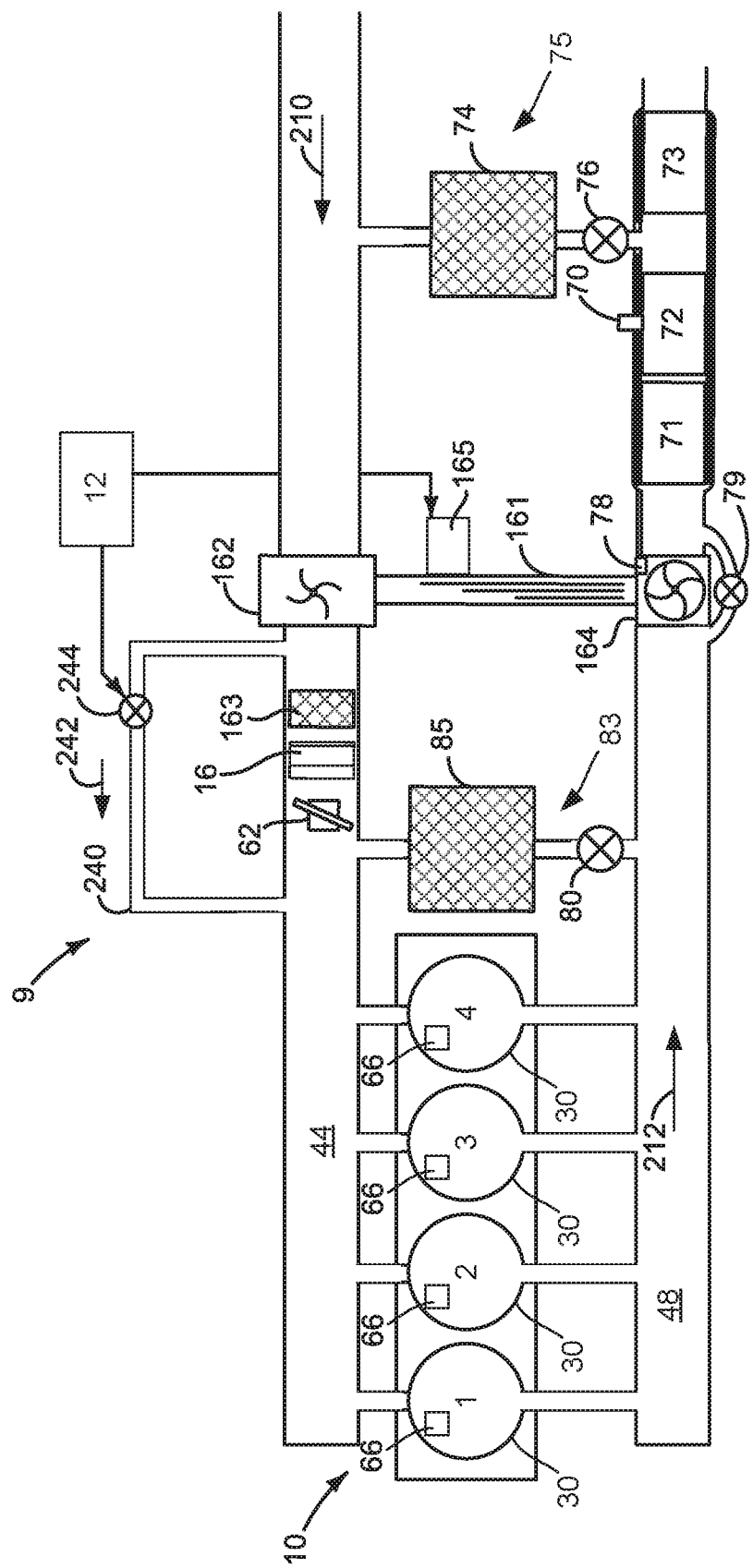

Referring now to FIG. 2N, this configuration of engine 10 includes electric machine 165 coupled to shaft 161 to rotate turbocharger compressor 162. Engine 10 also includes passage 240 and valve 244. During a cold engine start, valve 244 may be fully opened so that compressed air bypasses charge air cooler 163 and enters engine cylinders 30 via passage 240. Electric machine 165 may be consuming electrical energy and rotating turbocharger compressor 162 during a cold engine start, thereby heating and pressurizing air that enters engine 10. Glow plugs 60 may also be activated during the engine cold start to increases the temperature within engine cylinders. Air flows through passage 240 in the direction of arrow 242 during an engine cold start. Air flows into engine 10 in the direction indicated by arrow 210. Exhaust gases flow from the engine in the direction of arrow 212. Electrical machine 202, which drives electrically driven compressor 204, may be controlled as is described in further detail with reference to FIGS. 3-5, 7, and 8.

Figure 2O:
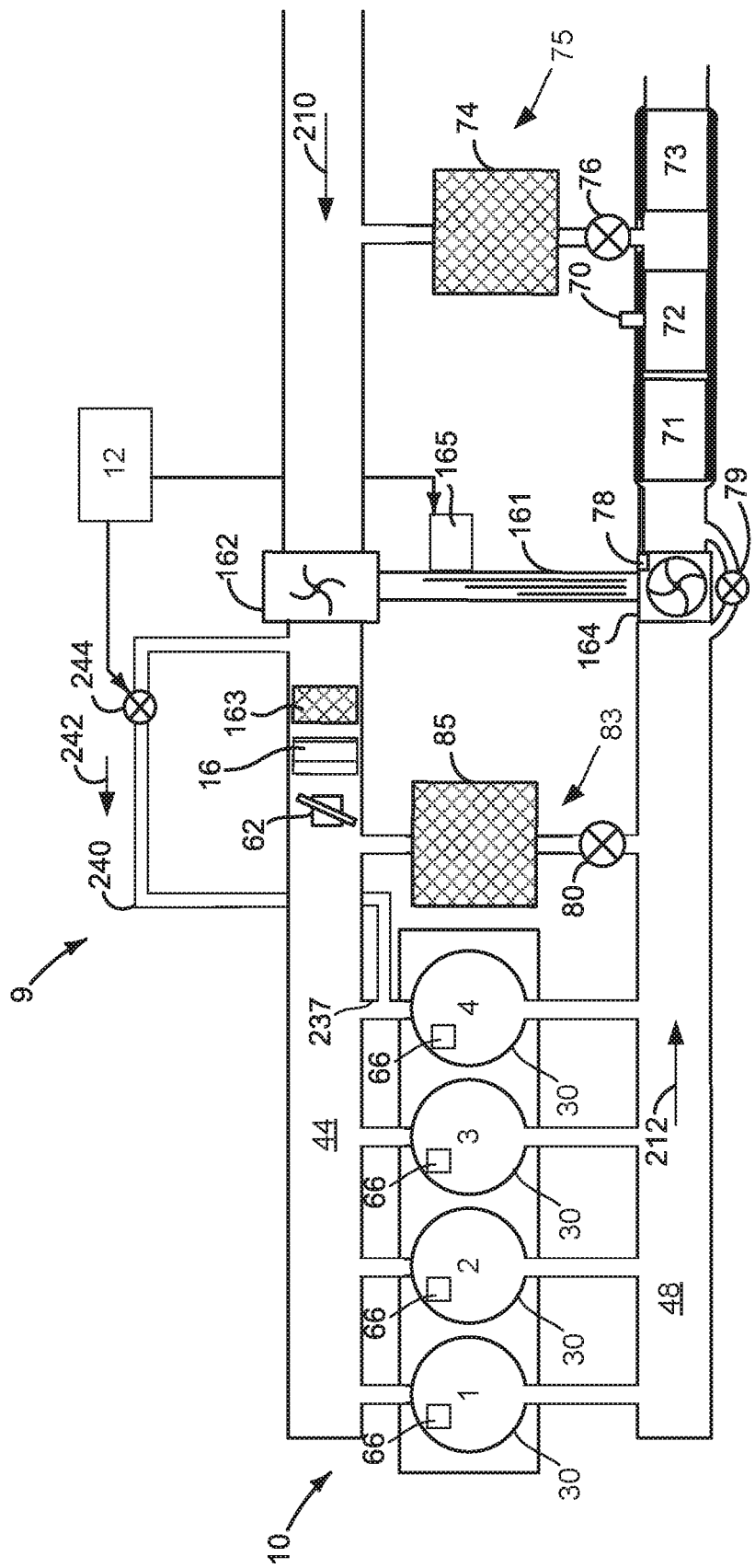

Referring now to FIG. 2O, this configuration of engine 10 is the same as the engine configuration that is shown in FIG. 2N except that passage 240 routes air from turbocharger compressor 162 directly to cylinder number four via runner 237 without supplying air to cylinder numbers one through three. During a cold engine start, valve 244 may be fully opened so that compressed air bypasses charge air cooler 163 and enters engine cylinders number four via passage 240. Electric machine 165 may be consuming electrical energy and rotating turbocharger compressor 162 during a cold engine start, thereby heating and pressurizing air that enters cylinder number four. In this configuration, all engine cylinders include glow plugs 66. Glow plugs 66 may be activated during the engine cold start to increases the temperature within engine cylinders so that combustion stability may be improved and so that the engine may start. Air flows through passage 240 in the direction of arrow 242 during an engine cold start. Air flows into engine 10 in the direction indicated by arrow 210. Exhaust gases flow from the engine in the direction of arrow 212. This configuration increases the temperature of air that is provided to cylinder number four so that combustion within cylinder number four may be improved during especially cold ambient temperature conditions. The improved combustion within cylinder number four may help to reduce engine noise and vibration during engine cold starting. Electrical machine 165, which drives turbocharger compressor 162, may be controlled as is described in further detail with reference to FIGS. 3-5, 7, and 8.

Figure 2P:
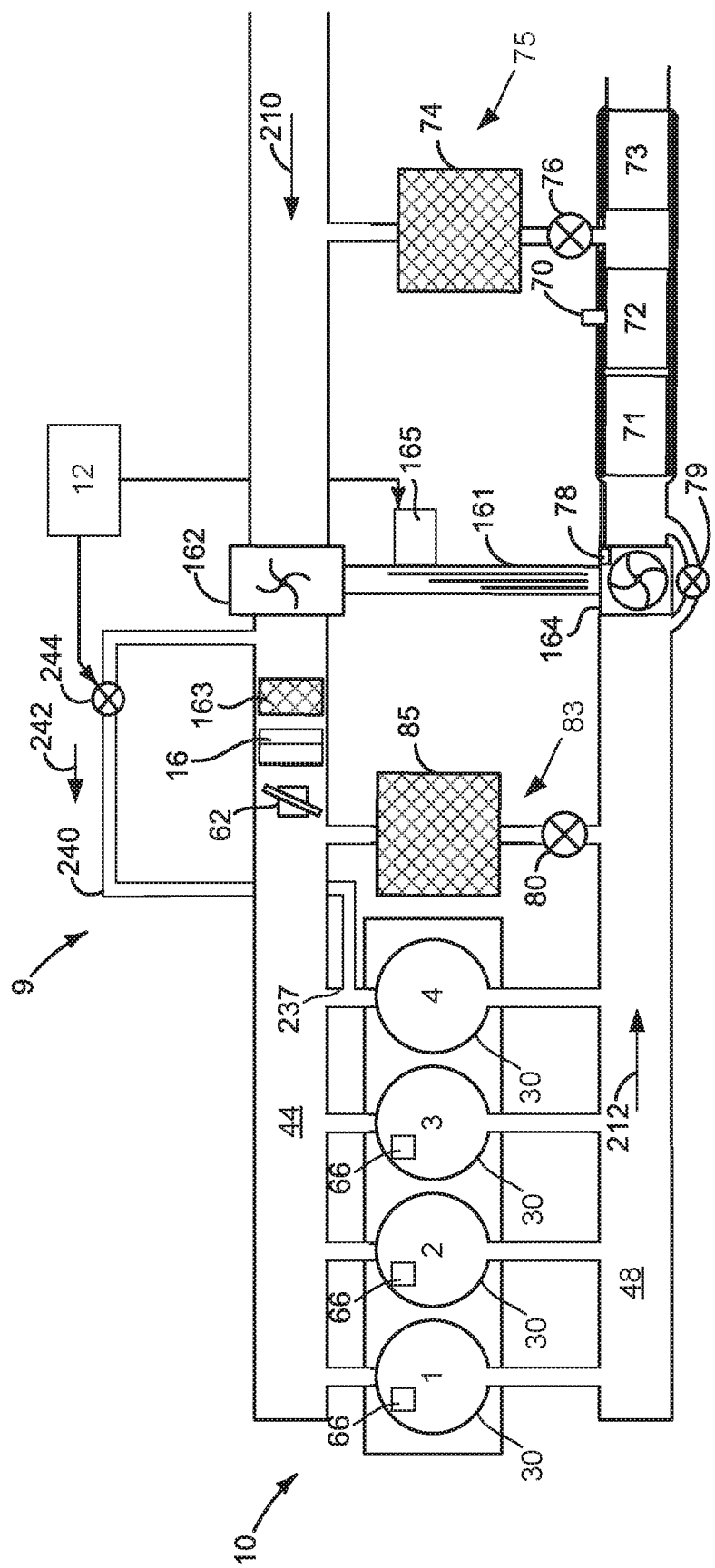

Referring now to FIG. 2P, this configuration of engine 10 is the same as the engine configuration that is shown in FIG. 2O except that cylinder number four does not include a glow plug. During a cold engine start, valve 244 may be fully opened so that compressed air bypasses charge air cooler 163 and enters engine cylinders number four via passage 240 and runner 237. Electric machine 165 may be consuming electrical energy and rotating turbocharger compressor 162 during a cold engine start, thereby heating and pressurizing air that enters cylinder number four. Cylinder numbers one through three include glow plugs 66. Cylinder number four does not include a glow plug. Glow plugs 66 may be activated during the engine cold start to increase the temperature within engine cylinders that are not supplied air via passage 240. Air flows through passage 240 in the direction of arrow 242 during an engine cold start. Air flows into engine 10 in the direction indicated by arrow 210. Exhaust gases flow from the engine in the direction of arrow 212. This configuration increases the temperature of air that is provided to cylinder number four so that combustion within cylinder number four may be improved. The improved combustion within cylinder number four may help to reduce engine noise and vibration during engine cold starting. Electrical machine 165, which drives turbocharger compressor 162, may be controlled as is described in further detail with reference to FIGS. 3-5, 7, and 8.

Figure 2Q:
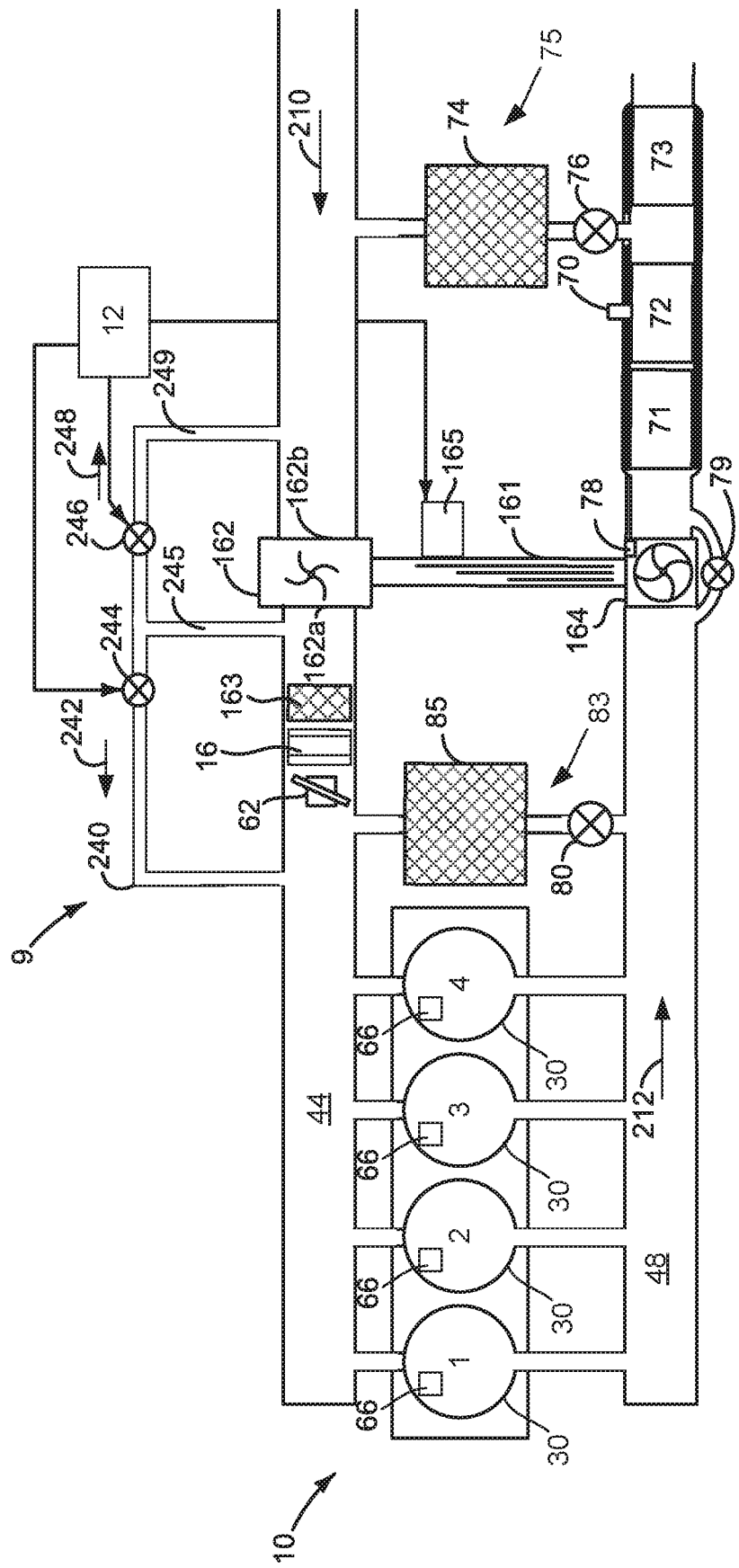

Referring now to FIG. 2Q, engine 10 is shown in the same configuration as it is shown in FIG. 2O, but this configuration includes passage 249 and valve 246. Further, air may travel through passage 245 to enter passage 240 and passage 249. During an engine cold start, electric machine 165 rotates turbocharger compressor 162. Air enters inlet 162b of turbocharger compressor 162 in the direction indicated by arrow 210 and air travels from outlet 162a of turbocharger compressor into passage 245 where a first portion of the air is directed to valve 244 and a second portion of the air is directed to valve 246. Valve 242 is at least partially open and air flows through passage 240 in the direction of arrow 242. Air flowing through passage 240 enters engine cylinders 30. Valve 246 is also at least partially open and air flows through passage 249 from passage 245 in the direction of arrow 248. Air flowing through passage 249 is returned to inlet 162b of turbocharger compressor 162. Air exiting turbocharger compressor 162 is pressurized and heated. The second portion of air traveling through passage 249 is pressurized a second time and heated a second time when it is returned to inlet 162b and passes through turbocharger compressor 162. Consequently, air that enters passage 240 may achieve a higher temperature as compared to if at least a portion of air is not returned to turbocharger compressor 162. Heated air exits passage 240 and it enters all engine cylinders. Glow plugs 66 may be included with engine 10 or they may be omitted. If glow plugs 66 are included with engine 10, they may be of a metallic type to reduce system cost. Further, grid heater 12 may optionally be included with engine 10 and it may also be activated during engine cold starting. Consequently, during very cold ambient temperatures, engine 10 may start and have a desired level of combustion stability. In some examples, a portion of air exiting turbocharger compressor 162 may pass through charge air cooler 163 and grid heater 16 before entering engine 10 during a cold engine start when higher amounts of engine air flow are desired. Electrical machine 165, which drives turbocharger compressor 162, may be controlled as is described in further detail with reference to FIGS. 3-5, 7, and 8.

Referring now to FIG. 2R, engine 10 is shown in the same configuration as it is shown in FIG. 2Q, but this configuration routes air from passage 240 directly to engine cylinder number four via runner 237. During an engine cold start, electric machine 165 rotates turbocharger compressor 162. Air enters inlet 162b of turbocharger compressor 162 in the direction indicated by arrow 210 and air travels from outlet 162a of turbocharger compressor into passage 245 where a first portion of the air is directed to valve 244 and a second portion of the air is directed to valve 246. Valve 242 is at least partially open and air flows through passage 240 in the direction of arrow 242. Air flowing through passage 240 is directly routed to cylinder number four. Valve 246 is also at least partially open and air flows through passage 249 from passage 245 in the direction of arrow 248. Air flowing through passage 249 is returned to inlet 162b of turbocharger compressor 162. Air exiting turbocharger compressor 162 is pressurized and heated. The second portion of air traveling through passage 249 is pressurized a second time and heated a second time when it is returned to inlet 162b and passes through turbocharger compressor 162. Consequently, air that enters passage 240 may achieve a higher temperature as compared to if at least a portion of air is not returned to turbocharger compressor 162. Glow plugs 66 may be included with engine 10 or they may be omitted. If glow plugs 66 are included with engine 10, they may be of a metallic type to reduce system cost. Further, grid heater 12 may optionally be included with engine 10 and it may also be activated during engine cold starting. Consequently, during very cold ambient temperatures, engine 10 may start and have a desired level of combustion stability. In some examples, a portion of air exiting turbocharger compressor 162 may pass through charge air cooler 163 and grid heater 16 before entering engine 10 during a cold engine start when higher amounts of engine air flow are desired.

The systems of FIGS. 1-2R provide for an engine system, comprising: a diesel engine including a compressor; an electric machine coupled to the compressor; a bypass valve in an air intake of the diesel engine; a recirculation valve in the air intake of the diesel engine; and a controller including executable instructions stored in non-transitory memory to determine an engine temperature that is less than a threshold temperature, and instructions to open the recirculation valve and open the bypass valve during an engine cold start in response to the engine temperature being less than the threshold temperature. The engine system further comprises additional instruction to adjust the electric machine to generate a desired temperature or pressure in the diesel engine, where the desired temperature or pressure is predetermined and varies with engine speed and load. The engine system includes where the electric machine is adjusted to increase boost pressure responsive to increasing engine speed. The engine system further comprises additional instructions to adjust the recirculation valve to generate a desired temperature or pressure in the diesel engine, where the desired temperature or pressure is predetermined and varies with engine speed and load. The engine system includes where the recirculation valve is adjusted based on a relationship between boost pressure and a temperature of the engine. The engine system further comprises additional instructions to fully close the recirculation valve until a boost pressure generated via the compressor exceeds a threshold.

Referring now to FIG. 3, a method for operating an engine is shown. In particular, a flowchart of a method for operating an internal combustion engine is shown. The method of FIG. 3 may be stored as executable instructions in non-transitory memory in systems such as shown in FIGS. 1-2R. The method of FIG. 3 may be incorporated into and may cooperate with the systems of FIGS. 1-2R. Further, at least portions of the method of FIG. 3 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 300 may determine selected control parameters from sensor inputs.

At 302, method 300 determines vehicle operating conditions. Vehicle operating conditions may include but are not limited to engine temperature, accelerator pedal position, ambient temperature, engine starting requests, ambient pressure, driver demand torque, and engine speed. Vehicle operating conditions may be determined via vehicle sensors and the engine controller described in FIG. 1.

At 304, method 300 judges if an engine start is requested or if the engine is running (e.g., combusting fuel and rotating). In one example, method 300 may judge that an engine start is requested based on a position of a key switch or state of a pushbutton. Alternatively, an engine start request may be generated based on transmission gear selected, driver demand torque, and brake pedal position. Method 300 may judge that the engine is running if the engine is combusting fuel and rotating under its own power. If method 300 judges that an engine start is requested or that the engine is running, the answer is yes and method 300 proceeds to 306. Otherwise, the answer is no and method 300 proceeds to exit.

At 306, method 300 judges if a temperature in the engine's intake manifold or temperatures in engine cylinders is less than a threshold temperature. In one example, the threshold temperature is a temperature of air entering the engine's cylinders below which combustion stability of fuel mixed with the air degrades to less than a predetermined amount. The temperature may be adjusted based on the type of fuel injected to the engine. If method 300 judges that the temperature is lower than the threshold temperature, the answer is yes and method 300 proceeds to 308. Otherwise, the answer is no and method 300 proceeds to 320.

At 320, method 300 operates the engine and applies base boost levels. The base boost levels may be empirically determined and stored in controller non-transitory memory. In one example, the base boost levels are stored in a table or function that is indexed or referenced via engine speed and driver demand torque (e.g., torque requested by the vehicle's driver). Further, boost may be provided by the electrically driven compressor, the turbocharger, or a combination of the electrically driven compressor and the turbocharger. In one example, the electrically driven compressor, the turbocharger compressor, or a combination of the turbocharger compressor and the electrically driven compressor are selected to provide a desired amount of boost based on engine operating conditions (e.g., engine speed and driver demand torque). Method 300 proceeds to exit after boost is provided to the engine via the electrically driven compressor, the turbocharger compressor, or a combination of the electrically driven compressor and the turbocharger compressor.

At 308, method 300 adjusts valves in the engine air intake to provide a desired level of boost and heating of air entering the engine. Further, method 300 adjusts operation of electric machines (e.g., 165 and 202) to provide a desired level of boost (e.g., air pressure between the engine throttle and a compressor) to the engine. The valves in the engine air intake may be configured as is shown in FIGS. 2A-2R. The valves in the engine air intake are operated as described in FIGS. 2A-2R. For example, as discussed in the description of FIG. 2F, valve 220 may be commanded fully closed and valve 225 may be commanded fully open during an engine cold start so that air entering the engine may be heated and pressurized twice before entering engine cylinders, once via turbocharger compressor 162 and once via electrically driven compressor 204. Additionally, or alternatively, the valves in the engine intake may be adjusted as is described in FIGS. 7 and 8. Further, electric machine 202 and electric machine 165 may be operated to provide a desired level of boost and air temperature rise as is described in FIGS. 2A-2R. Compressor speed may be adjusted as is described in FIG. 4. Alternatively, boost pressure may be adjusted responsive to a temperature in the engine (e.g., air temperature in the engine intake manifold) as is described in FIG. 5. In another alternative, a recirculation valve and compressors may be adjusted as is described by FIG. 7. Method 300 proceeds to 308.

At 310, method 300 operates glow plugs as is discussed in the description of FIGS. 2A-2R. Glow plugs may be activated by supplying electric power to the glow plugs. The glow plugs may be activated before engine cranking, while the engine is being cranked, during engine run-up to idle speed, and after the engine reaches idle speed while a temperature of the engine is less than a threshold temperature. Activating the glow plugs allows air fuel mixtures in the engine's cylinders to be heated so that the air-fuel mixtures reach ignition temperature during an engine cycle. The glow plugs are deactivated after the temperature of the engine reaches the threshold temperature. Method 300 proceeds to 312.

At 312, method 300 cranks the engine via an electric machine. In one example, the electric machine is a starter motor as is shown in FIG. 1. The engine is cranked via rotating the engine via the electric machine at a predetermined speed (e.g., 250 RPM). Method 300 proceeds to 314 after cranking the engine.

At 314, the engine is run by supplying fuel and air to engine cylinders. The fuel and air are mixed and combusted in the engine. The engine rotates under power provided via combusting the air and fuel mixtures. The amount of air provided to the engine may be adjusted via adjusting boost pressure and/or a position of the engine throttle.

Once the engine reaches operating temperature the valves in the engine's air intake may be closed to direct air through the charge air cooler and to reduce recirculation of air back to the compressors so that engine efficiency may be increased. Method 300 proceeds to exit.

In this way, operation of compressors and engine air intake valves may be adjusted to improve engine starting and combustion stability during and after a cold engine start. The engine air intake valves may be adjusted to bypass devices that cool air entering the engine and to recirculate air back to compressor inlets so that the air may be heated before it enters engine cylinders. The heated air improves the possibility of igniting air-fuel mixtures within the engine and combustion stability once the engine is started.

Referring now to FIG. 4, a control block diagram for a first way of controlling an electric machine that is coupled to a compressor or a turbocharger compressor is shown. The electric machine may be coupled to a compressor or a turbocharger compressor. Executable instructions stored in non-transitory memory of a controller may be provide to operate the engine according to the control block diagram. Further, the controller described in FIG. 4 may be included in the method of FIG. 3.

Engine speed and engine load are applied to reference table or function 402 included with controller 400. Table or function 402 outputs a desired temperature of an engine, such as air temperature in the engine intake manifold or temperature in an engine cylinder. The values in the table may be empirically determined via operating the engine on a dynamometer and measuring combustion stability as a function of engine speed and load at different engine temperatures. In one example, the desired temperature of the engine increases as engine speed increases. Thus, at lower engine speeds, the desired temperature of the engine is lower. At higher engine speeds, the desired temperature of the engine is higher. The desired temperature of the engine is input to summing junction 404.

Alternatively, table or function 402 may output a desired cylinder pressure. The desired pressure is input to summing junction 404. Thus, controller 400 may control to a desired pressure in the engine to improve combustion within the engine.

At block 404, the filtered actual temperature of the engine is subtracted from the desired temperature of the engine and the result is output to block 405. The output of block 404 is a temperature error value.

At block 405, the temperature error value is input to a discrete or digital proportional/integral/derivative (PID) controller. In one example, the discrete PID controller may be implemented via the following equation:

$$u(n) = u(n-1) + K_p\{e(n) - e(n-1)\} + K_i T_s e(n) \frac{K_d}{T_s}\{e(n) - 2e(n-1) + e(n-2)\}$$

where u(n) is the output of the discrete PID controller, $T_s$ is the sample time, e is the error, n is the discrete time interval (integer), $K_p$ is the proportional gain, $K_i$ is the integral gain, and $K_d$ is the derivative gain. Of course, other forms of the discrete PID controller may be applied. The output of the discrete PID controller is applied to the electric machine (e.g., 202 or 165) that rotates the compressor that provides boost at block 406. In one example, the output of the PID controller is converted into a voltage that commands electric machine speed. Alternatively, the output of the PID controller may adjust a duty cycle of a signal to adjust electric machine speed. The speed of the electric machine may be adjusted via adjusting a switching frequency of an inverter or via adjusting a voltage level that is supplied to the electric machine depending on the type of electric machine.

The electric machine represented by block 406 rotates the electrically driven compressor or the turbocharger compressor that is represented by block 408 and the compressor provides heated compressed air to the engine, which is represented by block 410. The temperature of the engine is measured via temperature sensor 412. Output of the temperature sensor is supplied to a filter (e.g., an analog or digital low pass filter) and output of the filter is provided to summing junction 404 where it is subtracted from the desired temperature of the engine.

If the output of block 402 is a desired pressure, cylinder pressure is measured at block 412 and cylinder pressure is filtered at block 414. The filtered cylinder pressure is then directed to summing junction 404.

Thus, a temperature of the engine may be closed-loop controlled via adjusting output of a compressor that is coupled to the engine. The speed of the compressor may be increased to increase pressure and temperature within the engine in order for the temperature in the engine to reach a desired temperature.

Referring now to FIG. 5, a control block diagram for a second way of controlling an electric machine that is coupled to a compressor or a turbocharger compressor is shown. Executable instructions stored in non-transitory memory of a controller may be provide to operate the engine according to the control block diagram. Further, the controller described in FIG. 5 may be included in the method of FIG. 3.

Controller 500 includes an intake manifold air temperature (MAT) controller block 502 that applies a gain to measured or actual intake manifold air temperature (e.g., multiplies the actual intake manifold pressure by the gain). The gain may be expressed as:

$$\text{Gain} = f\left(\frac{\partial T_2}{\partial P_2}\right)$$

$$\frac{\partial T_2}{\partial P_2} = \left(\gamma - \frac{1}{\gamma}\right)\frac{T_1\left(\frac{P_2}{P_1}\right)^{\left(\frac{-1}{\gamma}\right)}}{n_c P_1}$$

as derived from the following equation:

$$T_2 = T_1 + T_1 T_1 \frac{\left[\left(\frac{P_2}{P_1}\right)^{\frac{\gamma-1}{\gamma}} - 1\right]}{n_c}$$

where $T_2$ is compressor outlet temperature (may also be referred to as intake manifold air temperature), $T_1$ is compressor inlet temperature, $P_1$ is compressor inlet pressure, $P_2$ is compressor outlet pressure (may also be the intake manifold pressure), γ is a ratio of specific heats, and $n_c$ is compressor efficiency. The modified intake manifold temperature is output from block 502 and input to block 504.

Block 504 converts the manifold air temperature to a requested or desired boost amount (e.g., pressure in the engine intake downstream of the compressor, such as in the intake manifold). In one example, the conversion is performed based on the following equation:

$$P_2 = P_1\left[n_c\left(\frac{T_2}{T_1} - 1\right) + 1\right]^{\frac{\gamma}{(\gamma-1)}}$$

The desired boost amount (e.g., $P_2$) is input to summing junction 506 where the output of block 520 is subtracted from the desired boost amount to provide a boost error. The boost error exits summing junction 506 and is input to a discrete PID controller at block 508. The output of the discrete PID controller is applied to the electric machine (e.g., 202 or 165) at that rotates the compressor that provides boost at block 510. In one example, the output of the PID controller is converted into a voltage that commands electric machine speed. Alternatively, the output of the PID controller may adjust a duty cycle of a signal to adjust electric machine speed. The speed of the electric machine may be adjusted via adjusting a switching frequency of an inverter or via adjusting a voltage level that is supplied to the electric machine depending on the type of electric machine.

The electric machine represented by block 510 rotates the electrically driven compressor or the turbocharger compressor that is represented by block 512 and the compressor provides heated compressed air to the engine, which is represented by block 514. The compressor represented by block 512 may be electrically driven compressor 204 or turbocharger compressor 165 described herein. The temperature of the engine is measured via temperature sensor 516 and it is routed to block 502. Pressure in the engine intake manifold ($P_2$ or MAP) determined via a pressure sensor at block 520 and then it is input to summing junction 506.

Thus, a desired temperature of the engine may be converted into a boost pressure and an electric machine may provide the boost pressure to achieve the desired temperature. The boost pressure may be adjusted responsive to manifold pressure at a faster rate than the desired temperature of the engine may be adjusted.

Referring now to FIG. 6A, a plot of intake manifold temperature versus boost pressure is shown. FIG. 6A includes lines 602-608 to describe relationships between recirculation valve opening positions, intake manifold temperature, and boost. Line 610 represents a threshold intake manifold temperature for starting an engine. To start the engine, it is desired that engine intake manifold temperature is above threshold 610 to improve combustion within the engine. Line 602 describes an intake manifold temperature to boost level relationship when a recirculation valve is 75% open. Line 604 describes an intake manifold temperature to boost level relationship when a recirculation valve is 50% open. Line 606 describes an intake manifold temperature to boost level relationship when a recirculation valve is 25% open. Line 608 describes an intake manifold temperature to boost level relationship when a recirculation valve is 0% open. Thus, it may be observed that the engine may be started via opening the recirculation valve at least 50% and providing boost pressure greater than 1.1 bar during cold engine starting conditions. Lines 602-608 are based on adiabatic compression in the engine intake manifold. Lines 602-608 may be the basis for achieving the desired intake manifold temperature. For example, if desired intake manifold temperature is 10° C., then it may be determined from curves 602-608 that the desired intake manifold temperature may only be achieve by opening the recirculation valve at least 75% and operating a compressor to provide more than 1.1 bar of boost. In this way, lines 602-608 may be the basis for open loop intake manifold temperature requests.

Referring now to FIG. 6B, a plot of cylinder temperature versus boost pressure is shown. FIG. 6B includes lines 602-608 to describe relationships between recirculation valve opening positions, cylinder temperature, and boost. Line 610 represents a threshold cylinder temperature for starting an engine. To start the engine, it may be desired that cylinder temperature is above threshold 630. Line 620 describes an intake manifold temperature to boost level relationship when a recirculation valve is 75% open. Line 622 describes an intake manifold temperature to boost level relationship when a recirculation valve is 50% open. Line 624 describes an intake manifold temperature to boost level relationship when a recirculation valve is 25% open. Line 626 describes an intake manifold temperature to boost level relationship when a recirculation valve is 0% open. Thus, it may be observed that the engine may be started via opening the recirculation valve at least 50% and providing boost pressure greater than 1.1 bar. Lines 620-626 are based on adiabatic and isentropic compression in an engine cylinder. Lines 620-626 may be the basis for achieving the desired cylinder temperature. For example, if desired cylinder temperature is 575° C., then it may be determined from curves 620-626 that the desired cylinder temperature may only be achieve by opening the recirculation valve at least 75% and operating a compressor to provide more than 1.1 bar of boost. In this way, lines 620-626 may be the basis for open loop cylinder temperature requests.

Referring now to FIG. 7, a control block diagram for a third way of controlling an electric machine that is coupled to a compressor or turbocharger compressor is shown. Controller 700 also includes provisions for adjusting a position of a recirculation valve (e.g., valves 234 and 246 in FIGS. 2Q, 2M, 2L, and 2R). Executable instructions stored in non-transitory memory of a controller may be provide to operate the engine according to the control block diagram. Further, the controller described in FIG. 7 may be included in the method of FIG. 3.

Engine speed and engine load are applied to reference table or function 702 included with controller 700. Table or function 702 outputs a desired temperature of an engine, such air temperature in the engine intake manifold or temperature in an engine cylinder. The values in the table may be empirically determined via operating the engine on a dynamometer and measuring combustion stability as a function of engine speed and load at different engine temperatures. In one example, the desired temperature of the engine increases as engine speed increases. Thus, at lower engine speeds, the desired temperature of the engine is lower. At higher engine speeds, the desired temperature of the engine is higher. The desired temperature of the engine is input to summing junction 704.

Alternatively, table or function 702 may output a desired cylinder pressure. The desired pressure is input to summing junction 704. Thus, controller 700 may control to a desired pressure in the engine to improve combustion within the engine.

At block 704, the filtered actual temperature of the engine is subtracted from the desired temperature of the engine and the result is output to blocks 705 and 716. The output of block 704 is a temperature error value.

At block 705, the temperature error value is input to a discrete or digital proportional/integral/derivative (PID) controller. The PID controller may be of the form described in the description of FIG. 4. The output of the discrete PID controller is applied to the electric machine (e.g., 202 or 165) that rotates the compressor that provides boost at block 706. In one example, the output of the PID controller is converted into a voltage that commands electric machine speed. Alternatively, the output of the PID controller may adjust a duty cycle of a signal to adjust electric machine speed. The speed of the electric machine may be adjusted via adjusting a switching frequency of an inverter or via adjusting a voltage level that is supplied to the electric machine depending on the type of electric machine.

The electric machine represented by block 706 rotates the electrically driven compressor or the turbocharger compressor that is represented by block 708 and the compressor provides heated compressed air to the engine, which is represented by block 710. The temperature of the engine is measured via temperature sensor 712. Output of the temperature sensor is supplied to a filter at block 714 (e.g., an analog or digital low pass filter) and output of the filter is provided to block 704 where it is subtracted from the desired temperature of the engine.

If the output of block 702 is a desired pressure, cylinder pressure is measured at block 712 and cylinder pressure is filtered at block 714. The filtered cylinder pressure is then directed to summing junction 704.

Thus, a temperature of the engine may be closed-loop controlled via adjusting output of a compressor that is coupled to the engine. The speed of the compressor may be increased to increase pressure and temperature within the engine in order for the temperature in the engine to reach a desired temperature.

At block 716, the temperature error value is input to a second discrete or digital proportional/integral/derivative (PID) controller. The PID controller may be of the form described in the description of FIG. 4. The output of the discrete PID controller is applied to a recirculation valve in the engine air intake (e.g., valves 234 and 246 in FIGS. 2Q, 2M, 2L, and 2R) that returns air from a compressor outlet to a compressor inlet. In one example, the output of the PID controller is converted into a voltage that commands the recirculation valve position.

The recirculation valve actuator is represented by block 718 and it may be adjusted to open or close the recirculation valve that is represented by block 720. The position of recirculation valve 720 may be opened or closed to increase or reduce air flow from the compressor outlet to the compressor inlet. By increasing the opening amount of the recirculation valve, temperature in the intake manifold and engine cylinders may be increased. In other words, the compressor may put work into air that flows through the compressor multiple times before the air enters the engine. Consequently, the temperature of the engine may increase to improve engine starting and cranking during engine cold starting.

Thus, a temperature of the engine may be closed-loop controlled via adjusting output of a compressor that is coupled to the engine and by adjusting a position of a recirculation valve that is coupled to the engine. The speed of the compressor may be increased to increase pressure and temperature within the engine in order for the temperature in the engine to reach a desired temperature. Further, the recirculation valve may be opened to increase air temperature in the engine intake manifold and engine cylinders.

Referring now to FIG. 8, a method for operating compressors and a recirculation valve to control temperature within an engine is shown. The method of FIG. 8 may be included in the method of FIG. 3. Further, the method of FIG. 8 may be stored as executable instructions in non-transitory memory of a controller in systems such as are shown in FIGS. 1-2R. The method of FIG. 8 may be incorporated into and may cooperate with the systems of FIGS. 1-2R. Further, the method of FIG. 8 may be performed via a controller transforming operating states of devices and actuators in the physical world. The controller may employ engine actuators of the engine system to adjust engine operation, according to the method described below. Further, method 800 may determine selected control parameters from sensor inputs.

At 802, method 800 determines vehicle operating conditions. Vehicle operating conditions may include but are not limited to a temperature of the engine (e.g., intake manifold temperature or cylinder temperature), engine speed, engine load, boost pressure, a desired temperature of the engine (e.g., intake manifold temperature or cylinder temperature), and recirculation valve state. In one example, the desired temperature of the engine may be determined by indexing or referencing a table or function in controller memory. The table outputs the desired temperature of the engine. In one example, the table may be referenced via engine speed and values in the table may be empirically determined via operating the engine on a dynamometer. Method 800 proceeds to 804.

At 804, method 800 judges if boost pressure has reached a threshold boost level (e.g., a maximum boost level not to be exceeded). In one example, method 800 compares a measured boost amount to a predetermined threshold value stored in memory. If the measured or actual boost amount is greater than the threshold value, the answer is yes and method 800 proceeds to 806. Otherwise, the answer is no and method 800 proceeds to 820.

At 820, method 800 adjusts operation of a compressor or turbocharger compressor via adjusting output of an electric machine to provide the desired temperature of the engine. The operation of the compressor or turbocharger may be adjusted to provide the desired temperature of the engine via a controller such as one of the controllers described in FIGS. 4, 5, and 7. If a recirculation valve is included in the engine system it may be fully closed while the output of the compressor or turbocharger compressor is adjusted. Method 800 proceeds to exit.

At 806, method 800 judges if the temperature of the engine is less than the threshold temperature determined at 802. If so, the answer is yes and method 800 proceeds to 810. Otherwise, the answer is no and method 800 proceeds to 812.

At 812, method 800 fully closes and deactivates the recirculation valve (e.g., valves 234 and 246 in FIGS. 2Q, 2M, 2L, and 2R). The valve may be deactivated by ceasing to supply electrical current to the valve. Method 800 proceeds to exit.

At 810, method 800 activates the recirculation valve and adjusts the position of the recirculation valve to provide the desired temperature of the engine. In one example, the position of the recirculation valve is adjusted according to one of the relationships shown in FIGS. 6A and 6B. Further, the position of the recirculation valve may be adjusted via a controller as is shown in FIG. 7. For example, if the temperature of the engine has not reached the desired temperature, then the recirculation valve opening amount may be increased to increase the temperature of the engine. If the temperature of the engine exceeds the desired temperature, then the opening amount of the recirculation valve may be reduced. Method 800 proceeds to exit.

Thus, the methods described herein provide for an engine operating method, comprising: receiving sensor data to a controller; and adjusting operation of an electric machine that is coupled to a compressor via a controller to generate a predetermined desired temperature in an engine or a predetermined desired pressure in the engine, the predetermined desired temperature and the predetermined desired pressure changing as a function of engine speed and engine load. The engine method includes where the predetermined desired temperature is a temperature in an engine cylinder, and where the predetermined desired pressure is a pressure in the engine cylinder. The engine method includes where adjusting operation of the electric machine includes adjusting a speed of the electric machine. The engine method includes where the predetermined desired temperature increases as engine speed increases. The engine method further comprises adjusting a position of a recirculation valve to generate the predetermined desired temperature or the predetermined desired pressure. The engine method includes where adjusting the position of the recirculation valve includes opening the recirculation valve to increase a temperature of the engine. The engine method includes where the recirculation valve is positioned in a passage that extends from an inlet side of a compressor to an outlet side of the compressor. The engine method includes where the compressor is positioned upstream of a turbocharger compressor. The engine method includes where the compressor is a turbocharger compressor.

The methods described herein also provide for an engine operating method, comprising: receiving sensor data to a controller; and adjusting operation of an electric machine that is coupled to a compressor to generate a desired pressure in the engine via converting a temperature of an engine to a desired boost pressure of the engine, operation of the electric machine adjusted via a controller. The engine method further comprises subtracting an actual boost pressure from the desired boost pressure to generate a boost pressure error. The engine method further comprises adjusting operation of the electric machine in response to the boost pressure error. The engine method includes inputting the boost pressure error into a proportional/integral/derivative controller. The engine method includes where the compressor is a turbocharger compressor.

Referring now to FIG. 9, an example prophetic engine operating sequence for an engine is shown. The operating sequence of FIG. 9 may be produced via the system of FIGS. 1-2R executing instructions of the method described in FIGS. 3-5, 7, and 8. The plots of FIG. 9 are aligned in time and occur at the same time. Vertical markers at t0-t3 indicate times of particular interest during the sequence.

The first plot from the top of FIG. 9 represents engine state versus time. Trace 902 represents engine state and the engine is off when trace 902 is at a low level near the horizontal axis. The engine is on and receiving fuel combusting the fuel or at least attempting to combust the fuel via compression ignition when trace 902 is at a higher level near the vertical axis arrow. The vertical axis represents engine state. The horizontal axis represents time and time increases from the left side to right side of the figure.

The second plot from the top of FIG. 9 represents a temperature of the engine (e.g., intake manifold temperature or cylinder temperature) versus time. Trace 904 represents the temperature of the engine. The vertical axis represents temperature of the engine and temperature of the engine increases in the direction of the vertical axis arrow. The horizontal axis represents time and time increases from the left side to right side of the figure. Horizontal line 920 represents a threshold temperature. For engine temperatures below threshold 920, output of a compressor may be adjusted to provide a desired temperature of the engine. For engine temperatures above threshold 920, output of the compressor is not adjusted to provide the desired temperature of the engine.

The third plot from the top of FIG. 9 represents engine boost pressure versus time. Trace 906 represents engine boost pressure. The vertical axis represents engine boost pressure and engine boost pressure increases in the direction of the vertical axis arrow. The horizontal axis represents time and time increases from the left side to right side of the figure. Horizontal line 922 represents a threshold boost pressure. The recirculation valve is not opened and is fully closed while boost pressure is less than threshold 922. The recirculation valve is opened to generate the desired temperature of the engine when boost pressure exceeds or is equal to the boost level of line 922.

The fourth plot from the top of FIG. 9 represents engine speed versus time. Trace 908 represents engine speed. The vertical axis engine speed and engine speed increases in the direction of the vertical axis arrow. The horizontal axis represents time and time increases from the left side to right side of the figure.

The fifth plot from the top of FIG. 9 represents recirculation valve position versus time. Trace 910 represents recirculation valve position. The vertical axis represents recirculation valve position and the opening amount of the recirculation valve increases in the direction of the vertical axis arrow. The horizontal axis represents time and time increases from the left side to right side of the figure.

At time t0, the engine is stopped (not combusting and not rotating) and it is not being cranked (e.g., rotated under power provided via an electric machine or starter). The temperature of the engine is below threshold 304 and boost pressure is zero. Engine speed is also zero and the recirculation valve is fully closed.

At the time t1, engine cranking begins and boost pressure begins to be increased. The recirculation valve is fully closed engine speed is cranking speed (e.g., 250 RPM). The temperature of the engine remains below threshold 904.

Between time t1 and time t2, boost pressure is increased while the engine is at cranking speed. The boost pressure is increased via increasing compressor speed, and compressor speed is increased by increasing an amount of current supplied to electric machines to rotate the one or more compressors. Fuel is supplied to the engine (not shown) and the boost pressure quickly reaches threshold 906. The recirculation valve is opened in response to boost pressure exceeding threshold 906 without the desired temperature of the engine being reached. By opening the recirculation valve, the temperature of the engine may be increased. The engine accelerates from cranking speed and it reaches idle speed. The temperature of the engine is increased in response to boost pressure increasing and the recirculation valve being opened.

At time t2, the temperature of the engine exceeds threshold 904. The boost pressure is reduced and the recirculation valve is closed in response to the temperature of the engine exceeding threshold 904. By reducing boost pressure and closing the recirculation valve, engine efficiency may be improved. The engine speed continues to increase after time t2 and the engine remains activated.

In this way, operation of a compressor may be adjusted to increase a temperature of the engine. Further, a position of a recirculation valve may be adjusted to increase the temperature of the engine. The compressor output may be adjusted via one of the controllers described herein.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
during combustion operation of an engine, adjusting operation of an electric machine that is coupled to a compressor via a controller to generate a predetermined desired temperature in an engine cylinder or a predetermined desired pressure in the engine cylinder, the predetermined desired temperature and the predetermined desired pressure changing as a function of engine speed and engine load.

2. The engine operating method of claim 1, where adjusting operation of the electric machine includes adjusting a speed of the electric machine.

3. The engine operating method of claim 1, where the predetermined desired temperature increases as engine speed increases.

4. The engine operating method of claim 1, further comprising:
adjusting a position of a recirculation valve to generate the predetermined desired temperature or the predetermined desired pressure.

5. The engine operating method of claim 4, where adjusting the position of the recirculation valve includes opening the recirculation valve to increase a temperature of the engine.

6. The engine operating method of claim 4, where the recirculation valve is positioned in a passage that extends from an inlet side of the compressor to an outlet side of the compressor.

7. The engine operating method of claim 6, where the compressor is positioned upstream of a turbocharger compressor.

8. The engine operating method of claim 1, where the compressor is a turbocharger compressor.

9. An engine operating method, comprising:
adjusting operation of an electric machine that is coupled to a compressor to generate a desired pressure in an engine cylinder, wherein adjusting operation of the electric machine includes converting a measured temperature of an engine to a desired boost pressure of the engine, and wherein operation of the electric machine is adjusted via a controller based on the desired boost pressure.

10. The engine operating method of claim 9, further comprising subtracting an actual boost pressure from the desired boost pressure to generate a boost pressure error.

11. The engine operating method of claim 10, further comprising adjusting operation of the electric machine in response to the boost pressure error.

12. The engine operating method of claim 11, further comprising inputting the boost pressure error into a proportional/integral/derivative controller.

13. The engine operating method of claim 9, where the compressor is a turbocharger compressor.

14. An engine system, comprising:
a diesel engine including a compressor;
an electric machine coupled to the compressor;
a bypass valve in an air intake of the diesel engine;
a recirculation valve in the air intake of the diesel engine; and
a controller including executable instructions stored in non-transitory memory to determine an engine temperature that is less than a threshold temperature, and instructions to open the recirculation valve and open the bypass valve during an engine cold start in response to the engine temperature being less than the threshold temperature,
wherein the electric machine is adjusted to increase the engine temperature to a desired temperature, where the desired temperature is a predetermined temperature, and where the desired temperature is varied as engine speed and load varies during combustion operation of the diesel engine.

15. The engine system of claim 14, further comprising additional instruction to adjust the electric machine to generate the desired pressure in the diesel engine, where the desired pressure is predetermined and is varied as engine speed and load varies.

16. The engine system of claim 15, where the electric machine is adjusted to increase boost pressure responsive to increasing engine speed.

17. The engine system of claim 14, further comprising additional instruction to adjust the recirculation valve to generate the desired temperature or a desired pressure in the diesel engine, where the desired temperature or pressure is predetermined and varies with engine speed and load.

18. The engine system of claim 14, where the recirculation valve is adjusted based on a relationship between boost pressure and the temperature of the engine.

19. The engine system of claim 14, further comprising additional instructions to fully close the recirculation valve until a boost pressure generated via the compressor exceeds a threshold.

* * * * *